Jan. 23, 1973  J. F. SKEEHAN ET AL  3,713,004
CIRCUIT BREAKER INCLUDING IMPROVED PROTECTIVE DEVICE
Filed March 30, 1972  3 Sheets-Sheet 1

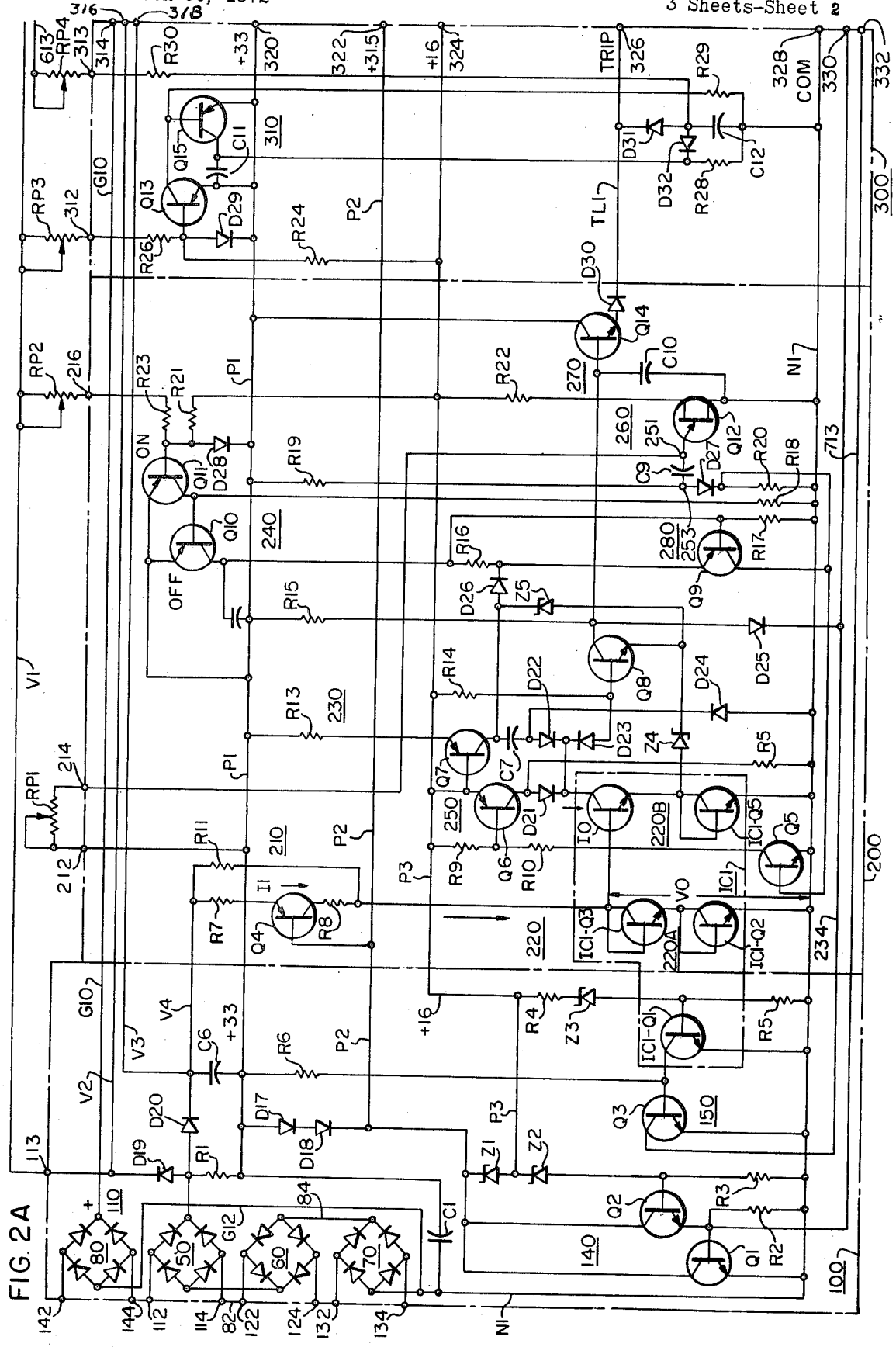

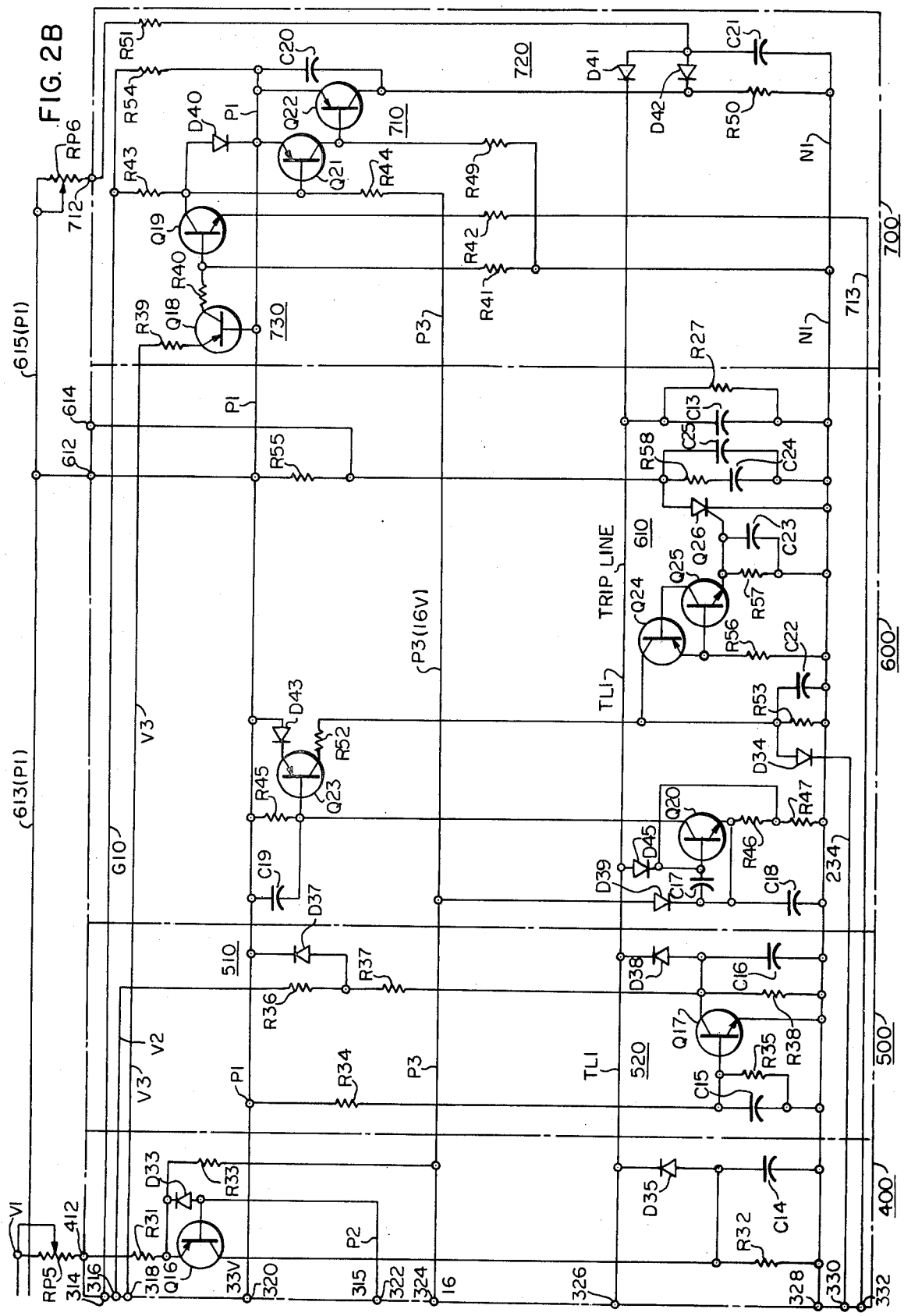

United States Patent Office 3,713,004
Patented Jan. 23, 1973

3,713,004
CIRCUIT BREAKER INCLUDING IMPROVED
PROTECTIVE DEVICE
Joseph F. Skeehan, North Versailles, and William H.
South, McKeesport, Pa., assignors to Westinghouse
Electric Corporation, Pittsburgh, Pa.
Filed Mar. 30, 1972, Ser. No. 239,506
Int. Cl. H01h 47/18
U.S. Cl. 317—33 R                                    6 Claims

ABSTRACT OF THE DISCLOSURE

A circuit breaker including separable contacts, an operating means or mechanism for opening and for closing and latching in the contacts, and an overcurrent protective device including means which are responsive to the current in the separable contacts and an electrical circuit which is being protected by the circuit breaker to actuate the operating means of the circuit breaker to open said contacts upon the occurrence of predetermined operating conditions. The protective device includes means which actuate said operating means after a predetermined time delay which may vary inversely with the current for certain overcurrents or which may be substantially fixed or of a predetermined duration for certain overcurrents and at least one means which is responsive substantially instantaneously when the current in the associated contacts or electrical circuit exceeds or increases above a predetermined value and additional means which is connected to render the last-mentioned means inoperative or to inhibit its operation during certain operating conditions of the circuit breaker even when the current in the contacts is relatively low compared with the continuous current rating of the circuit breaker.

CROSS-REFERENCES TO RELATED APPLICATIONS

Certain inventions either disclosed in the present application or related to those disclosed in the present application are disclosed and claimed in copending application Ser. No. 239,510 filed concurrently by Joseph C. Engel, Ser. No. 35,517 filed May 7, 1970 by Joseph C. Engel and Robert T. Elms and Ser. No. 35,516, now Pat. No. 3,660,722, filed May 7, 1970, by John T. Wilson and Joseph C. Engel which are all assigned to the same assignee as the present application.

BACKGROUND OF THE INVENTION

This invention relates to circuit breakers and more particularly to overcurrent protective devices which actuate the operation of such circuit breakers.

A problem arises in certain types of circuit breakers where the capability of the operating mechanims or means of a particular circuit breaker is limited with respect to the maximum current against which the contacts of the circuit breaker can be closed by the associated operating means or mechanism of the circuit breaker and remain latched in a closed condition. Whatever type of overcurrent protective device or protective relay is provided to control and actuate the operation of the circuit breaker should actuate the operating means of the circuit breaker to trip or open substantially instantaneously if the circuit breaker should attempt to close against a fault current which exceeds a predetermined value which is substantially the maximum current against which the operating means of the circuit breaker is capable of closing and latching in the contacts of the circuit breaker. Once the contacts of the circuit breaker are closed and latched in, however, the protective device provided should not necessarily actuate the circuit breaker to trip substantially instantaneously if a fault current of the same predetermined value should occur since the operating means of the circuit breaker may be capable of maintaining or holding the contacts of the circuit breaker closed against such a fault current for at least a short time period which may be coordinated with the short time delay operating characteristics of the protective device.

One solution to the problem described above is to provide a circuit breaker including a protective device of the type disclosed in U.S. Pat. No. 3,543,094 which issued Nov. 24, 1970 to William H. South and John H. Taylor and which is assigned to the same assignee as the present application. The latter protective device includes a means which is responsive to a predetermined value of current which is substantially equal to the maximum current against which the contacts of the circuit breaker can be closed by the associated operating means and the associated circuit breaker includes an auxiliary contact which is electrically connected to the above-mentioned means and which is actuated between operating positions when the contacts of the circuit breaker are closed and latched in to render the above-mentioned means inoperative or to inhibit the operation of the above-mentioned means. One disadvantage of this solution is that it requires an additional auxiliary contact which is actuated by the operating means of the circuit breaker and also requires electrical connections or wiring between the auxiliary contact of the circuit breaker and the associated protective device.

Another solution to the problem described is to provide a circuit breaker including a protective device as disclosed in U.S. Pat. No. 3,634,730 which issued Jan. 11, 1972 to John T. Wilson and is assigned to the same assignee as the present application. The protective device disclosed in the latter patent includes a first means which is responsive to a predetermined value of current which is substantially equal to the maximum current against which the contacts of the associated circuit breaker can be closed and latched in by the associated operating means of the circuit breaker. The protective device also includes a second means responsive to the current in the contacts of the associated circuit breaker to render the above-mentioned first means inoperative when the contacts of the circuit breaker are closed after substantially a predetermined time delay. One disadvantage of this solution is that the operation of the second means of the protective device disclosed depends upon potentials which are derived from the current or currents in the contacts of the associated circuit breaker of a predetermined level which may be approximately 30 percent of the continuous current rating of the circuit breaker. It would therefore be desirable to provide a circuit breaker including a protective device of the type described which would respond to lower levels of current in the contacts of the associated circuit breaker to render inoperative the associated means which is responsive to a predetermined value of current which is substantially equal to the maximum current against which the operating means of the circuit breaker is capable of closing and latching in said contacts.

SUMMARY OF THE INVENTION

In accordance with the invention, a circuit breaker includes separable contacts which are rated or adapted to carry a predetermined continuous current, an operating means or mechanism for opening and for closing and latching in said contacts and an overcurrent protective device operatively connected to said operating means for producing an output in response to certain operating conditions of said circuit breaker to actuate said operating means to open said contacts and including a first means responsive to the current in said contacts for producing at least one unidirectional output potential. The protective device also includes a second means responsive to the current or to the highest current in the contacts of the associated circuit breaker to actuate the protective device to produce an output when said current exceeds a first predetermined value after substantially a predetermined time delay to thereby actuate the operating means of the circuit breaker to open said contacts. In addition, the protective device includes a third means responsive to the current or to the highest current in the contacts of the associated circuit breaker for independently actuating said protective device to produce said output substantially instantaneously when said current exceeds a second predetermined value which is substantially equal to the maximum current against which the operating means or mechanism is capable of closing and latching in said contacts. Finally, the protective device includes a fourth means responsive to the current in said contacts and connected in circuit relation with the above-mentioned first means for rendering the associated third means inoperative to actuate said protective device to produce the above-mentioned output when said contacts are closed and latched in by the associated operating means after substantially a predetermined time delay which starts when the unidirectional output potential of the first means increases to a predetermined value which results when a relatively small portion of the predetermined continuous current rating of the circuit breaker is being carried by the contacts of the associated circuit breaker. The last-mentioned predetermined time delay is sufficient to allow a reasonable time for the operating means of the associated circuit breaker to close and latch in the associated contacts.

In another embodiment of the applicants' invention the protective device may include first and second means for responding to substantially first and second predetermined values of current to independently actuate said protective device to produce an output substantially instantaneously to thereby actuate the operating means of the associated circuit breaker to open the contacts of the circuit breaker and an associated means for rendering only one of the first or second means inoperative to actuate said protective device to produce the above-mentioned output when said contacts are closed and latched in by the operating means of the associated circuit breaker after substantially a predetermined time delay.

BRIEF DESCRIPTION OF THE DRAWINGS

For a better understanding of the invention, reference may be had to the preferred embodiment exemplary of the invention shown in the accompanying drawings in which:

FIGS. 2A and 2B taken together are detailed schematic diagrams of the portion of the protective relay device or circuit which are shown in block form in FIG. 1.

DESCRIPTION OF THE PREFERRED EMBODIMENTS

Figure 1:
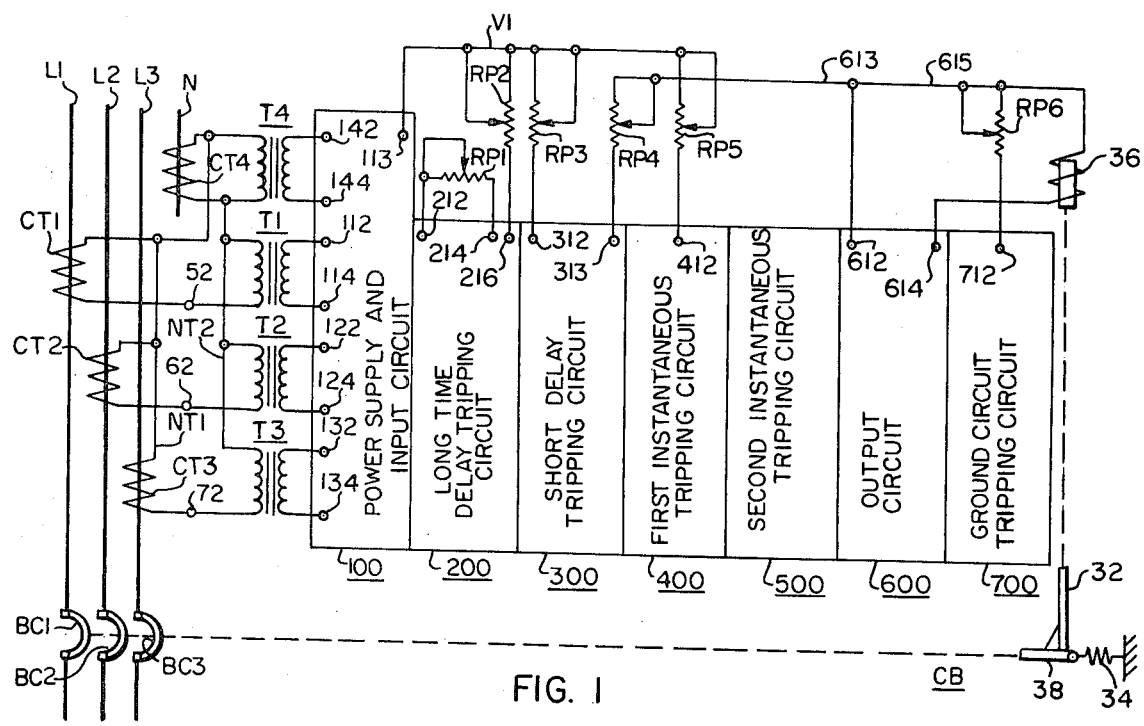
FIG. 1 is a schematic diagram, partly in block form, of a circuit breaker including an overcurrent protective relay device or circuit of the inverse time delay type embodying the invention and associated with an electrical system or circuit.

Referring now to the drawings and FIG. 1 in particular, there is illustrated a circuit breaker CB including an overcurrent protective relay or device or circuit associated with the line conductors L1, L2 and L3 of an electrical power system or circuit to be protected. The electrical system may be of any desired type such as a single phase system or a polyphase system. It will be assumed for purposes of the present description that the electrical system is a three-phase alternating current system represented by the line conductors L1, L2 and L3 and designed for operation at a frequency of approximately 60 hertz or cycles per second. The circuit breaker or circuit interrupter CB is provided for isolating or segregating different portions of electrical systems during certain abnormal or fault conditions such as an overcurrent condition. The circuit breaker CB includes a plurality of separable line contacts BC1, BC2 and BC3 which are closed when the circuit breaker CB is closed and which are open when the circuit breaker CB is open. The circuit breaker also includes a trip coil or means 36 which when energized while the circuit breaker is closed actuates or results in a tripping or opening operation of the circuit breaker CB. As illustrated diagrammatically in FIG. 1, energization of the trip coil 36 may actuate an operating member 32 to release a latch member 38 to thereby actuate an opening operation of the main or line contacts BC1, BC2 and BC3 under the influence of a suitable operating means, such as the opening spring 34, which may be operatively connected to said line contacts.

In general, the protective device shown in FIG. 1 is arranged to respond to only the highest or largest of the line currents which flow in the conductors L1, L2 and L3 to produce an output which energizes the trip coil or trip operator 36 and to actuate the tripping or opening of the circuit breaker CB upon the occurrence of certain operating conditions associated with the circuit breaker CB. As illustrated, the protective device shown in FIG. 1 includes a long time delay tripping circuit 200 which responds to the highest line current in the conductors L1, L2 and L3 to actuate said protective device to produce the above-mentioned output which energizes the trip coil 36 after a time delay which is initiated or starts when the highest of said line currents increases above or exceeds a predetermined value and which varies inversely with substantially the square of the highest line current in said conductors for a predetermined range of overcurrents in said conductors. In addition, the protective device shown in FIG. 1 may also include a short delay tripping circuit 300 which responds to the highest line current in the conductors L1, L2 and L3 to actuate said protective device to produce the above-mentioned output which energizes the trip coil 36 after substantially a fixed or predetermined time delay which is initiated when the highest line current of said conductors exceeds a predetermined value. Where desired, the protective device shown in FIG. 1 may also include a first instantaneous tripping circuit 400 which responds to the highest line current in the conductors L1, L2 and L3 to actuate said protective device to produce the above-mentioned output which energizes the trip coil 36 in a substantially instantaneous manner without any intentional or deliberate time delay when the highest line current in said conductors exceeds a predetermined value whenever the line contacts of the circuit breaker CB are closed. In accordance with the invention, the protective device shown in FIG. 1 also includes a second instantaneous tripping circuit 500 which may be the only instantaneous tripping circuit provided in a particular application which responds to the highest line current in the conductors L1, L2 and L3 to actuate said protective device to produce the above-mentioned output which actuates the energization of or energizes the trip coil 36 and which is operative only during a closing operation of the circuit breaker CB prior to the time that the line contacts of the circuit breaker CB are closed and latched in. In addition, where desired, the protective device shown in FIG. 1 may also include a ground current tripping cricuit 700 of the same general type disclosed in copending application Serial No. 35,516, filed May 7, 1970, by John T. Wilson and Joseph C. Engel which responds to a predetermined ground current in the electrical system which includes the line conductors L1, L2 and L3 as long as the highest line current is less than a predetermined value and to a ground current of a predetermined value which varies with the highest line current after the highest line current exceeds the last-mentioned predetermined value to actuate said protective device to produce the above-mentioned output which energizes the trip coil 36 after a substantially fixed or predetermined time delay when the ground current exceeds the appropriate predetermined value depending upon whether the highest line current is above or below the predetermined value as previously indicated and which initiates the start of the substantially fixed or predetermined time delay provided in the operation of the ground current tripping circuit 700.

In order to obtain a plurality of output currents which are substantially proportional to the line currents in the line conductors L1, L2 and L3, a plurality of current transformers or sensors CT1, CT2 and CT3 is provided, as shown in FIG. 1, with the primary windings of said current transformers being energized in accordance with the line currents in the line conductors L1, L2 and L3, respectively. In addition, in order to obtain an output current which is directly proportional to the current in a neutral conductor N, the current transformer CT4 is provided as shown in FIG. 1 with the winding of the current transformer CT4 being energized in accordance with the current in the neutral conductor N. The output windings of the current transformers CT1, CT2 and CT3 are Y connected between the neutral terminal or conductor NT1 and the respective output terminals 52, 62 and 72 to provide an output current to the ground current transformer T4 which varies with the degree of unbalance of the current in the line conductors L1, L2 and L3 where ground fault protection is desired. It is to be noted that in a four wire alternating current system as illustrated in FIG. 1, current flows in the neutral conductor N even with no ground fault present whenever an unbalanced load causes the three phase or line current to be unequal. During such as operating condition, the current in the neutral conductor N would not be sensed or detected by the current transformers CT1, CT2 and CT3 and a net current would flow from the conductor NT1 to the primary winding of the ground current transformer T4 which would then improperly indicate a ground fault current. The output winding of the additional current transformer CT4 is therefore connected to the primary winding of the ground current transformer T4 as shown in FIG. 1 to compensate the input current of the transformer T4 for the current flowing in the neutral conductor N. The current transformer T4 reflects any current in the neutral conductor N to the primary winding of the transformer T4 so that all current components applied to the ground current transformer T4 from the current transformers CT1, CT2, CT3, and CT4 cancel during the operating condition when the loads connected to the line conductors L1, L2 and L3 are unbalanced but when there is no actual ground fault operating condition. When an actual ground fault does occur in the alternating current system shown in FIG. 1, the fault current in the neutral conductor N appears only in the primary winding of the ground current transformer T4 and the alternating output current in the secondary winding of the transformer T4 is substantially proportional to only the ground fault current in the alternating current system shown in FIG. 1.

In order to further step down the output currents of the current transformers CT1, CT2 and CT3, the intermediate transformers T1, T2 and T3 which may be of the saturating type are connected between the secondary windings of said current transformers and the input terminals of the power supply input circuit 100 of the protective device shown in FIG. 1. More specifically, the primary windings of the transformers T1, T2 and T3 are Y connected between the output terminals 52, 62 and 72, respectively, of the current transformers CT1, CT2 and CT3, respectively, and the neutral conductor NT2 with the neutral terminal NT2 being connected to the neutral terminal NT1 of said current transformers through the primary winding of the ground current transformer T4. The secondary windings of the intermediate transformers T1, T2 and T3 are connected to the input terminals 112 and 114, 122 and 124 and 132 and 134, respectively, of the power supply input circuit 100 of the protective device shown in FIG. 1 to provide three alternating output currents which, in turn, are directly proportional to the line currents in the conductors L1, L2 and L3 of the electrical system as illustrated. The secondary winding of the ground current transformer T4 is connected to the input terminals 142 and 144 of the power supply input circuit 100 to provide an alternating output current which is directly proportional to the ground fault current in the alternating current system which includes the conductors L1, L2 and L3 and the neutral conductor N.

POWER SUPPLY INPUT CIRCUIT 100

In order to rectify the alternating curent output of the transformers T1, T2, T3 and T4, the power supply input circuit 100 of the protective device shown in FIG. 1 includes a plurality of full wave bridge type rectifiers 50, 60, 70 and 80, respectively, as illustrated in FIG. 2A of the drawings. As shown in FIG. 2A, the input terminals of the full wave rectifier 50 are connected to the terminals 112 and 114 which, in turn, are connected to the secondary winding of the transformer T1. Similarly, the input terminals of the full wave rectifiers 60, 70 and 80 at the terminals 122 and 124, 132 and 134 and 142 and 144, respectively, are connected to the secondary windings of the transformers T2, T3 and T4, respectively.

In order to obtain a unidirectional current which is substantially proportional to only the highest of the line currents in the conductors L1, L2 and L3, the full wave bridge type rectifier circuits 50, 60 and 70 of the power supply input circuit 100 are connected in a current auctioneering circuit 110 of the type which is described in greater detail in copending application Ser. No. 35,517 previously mentioned. More specifically, the unidirectional output terminals of the bridge circuits 50, 60 and 70 are electrically connected in series circuit relationship by the electrical conductors 82 and 84 with the output terminals of the respective bridge circuits being poled so that the output unidirectional currents of the bridge circuits 50, 60 and 70 tend to flow in the same direction in the series circuit which includes said bridge circuits. The output current of the current auctioneering circuit 110 is available between the positive output terminal of the bridge circuit 50 and the negative output terminal of the bridge circuit 70. In order to develop a unidirectional current voltage which is substantially proportional to only the highest of the instantaneous line currents in the conductors L1, L2 and L3, the current auctioneering circuit 110 includes a resistor R1 which is connected between the positive output terminal of the bridge circuit 50 and the conductor P1. One or more filter capacitors, as indicated at C1 in FIG. 2A is connected between the conductor P1 and the negative output terminal of the bridge circuit 70 which, in turn, is electrically connected to a common conductor N1 of the overall static protective device or circuit shown in FIG. 1. In order to provide a plurality of regulated, filtered, unidirectional voltages or potentials for the balance of the protective device shown in FIGS. 1 and 2, a shunt voltage regulator 140 is connected electrically in parallel with the capacitor C1 between the conductor P1 and the common conductor N1 as will be described in detail hereinafter.

In the operation of the current auctioneering circuit 110, the bridge rectifier circuits 50, 60 and 70 in combination with the associated transformers T1, T2 and T3, respectively, and the current transformers CT1, CT2 and CT3, respectively, form a plurality of substantially constant unidirectional current sources which are operatively connected in series circuit relation as just mentioned. As explained in greater detail in copending application Ser. No. 35,517 previously mentioned, the series circuit connection of the bridge circuits 50, 60 and 70 permits only the highest of the unidirectional output currents from said bridge circuits to flow between the positive terminal of the bridge circuit 50 and the negative terminal of the bridge circuit 70 because of the substantially constant current characteristics of the connections of the auctioneering circuit 110 just described. In other words, when the output unidirectional current of one of the bridge circuits 50, 60 and 70 is instantaneously relatively greater or larger than those of the other bridge circuits, only the highest instantaneous unidirectional currents in the bridge circuits 50, 60 and 70 will flow through the resistor R1 to develop a unidirectional voltage which is substantially proportional to only the highest of the instantaneous line currents flowing in the conductors L1, L2 and L3. Depending upon the relative magnitudes of the output currents of the bridge circuits 50, 60 and 70, certain diodes which form part of the bridge circuits 50, 60 and 70 and more specifically in the bridge circuits whose output currents are relatively less than the output current of the bridge circuit which is producing the instantaneously highest output current will functionally provide forward poled shunt or parallel circuits between the output terminals of the bridge circuits to carry the difference between the highest current which is available at the output terminals of the current auctioneering circuit 110 and the output current of the particular bridge circuit through which the highest current must flow to reach the output terminals of the current auctioneering circuit 110.

It is to be noted that the upper end of the resistor R1 at the positive output terminal of the bridge circuit 50 is connected to the variable voltage output conductor or bus V1 through the forward connected diode D19 and the terminal 113. The instantaneous unidirectional voltage of the auctioneering circuit 110 at the output conductor V1 which appears across the resistor R1 will be equal to the voltage between the conductor V1 and the conductor P1 less the forward voltage drop across the diode D19. It is important to note that the unidirectional output voltage which appears between the conductors V1 and P1 is unfiltered for reasons which will be explained hereinafter. The upper end of the resistor R1 is also connected to the variable voltage output conductor or bus V2 through the forward connected diode D20. Specifically, the variable voltage output conductor or bus V2 is connected to the cathode of the diode D19 and the voltage between the conductor V2 and the conductor P1 will be equal to the instantaneous unidirectional output voltage of the auctioneering circuit 110 which appears across the resistor R1 less the forward voltage drop across the diode D19 and will also be unfiltered.

The upper end of the resistor R1 is also connected to the variable voltage output conductor or bus V3 through the forward connected diode D20. The instantaneous unidirectional output voltage of the auctioneering circuit 110 is also available between the conductors V3 and P1, the latter voltage being equal to the unidirectional voltage across the resistor R1 less the forward voltage drop across the diode D20. The unidirectional output voltage between the conductors V3 and P1 is filtered by the capacitor C6 which is connected between the conductors V3 and P1. The capacitor C6 is provided to insure that the long time delay tripping circuit 200 will respond only to the highest of the line currents flowing in the conductors L1, L2 and L3 as reflected by the instantaneous output voltage across the resistor R1 as will be explained in greater detail hereinafter.

As previously mentioned, the shunt voltage regulator 140 is electrically connected in parallel with the filter or energy storing capacitor C1. More specifically, the shunt regulator circuit 140 includes a series circuit which is connected electrically in parallel with the capacitor C1 between the conductor P1 and the common conductor N1 and which includes the forward connected diodes D17 and D18, the reversely poled Zener diodes Z1 and Z2, the base-emitter circuit of the current amplifying transistor Q2 and the emitter load resistor R2. The base of the NPN transistor Q2 is connected to the common conductor N1 through the current limiting resistor R3 while the collector of the transistor Q2 is connected to to the junction point between the diode D18 and the Zener diode 61. The shunt voltage regulator 140 also includes a second current amplifying transistor NPN Q1 whose base is connected to the emitter of the transistor Q2 at the upper end of the resistor R2 while the emitter of the transistor Q1 is connected to the common conductor N1 as shown in FIG. 2A. The collector of the transistor Q1 is also connected to the collector of the transistor Q2 at the junction point between the diode D18 and the Zener diode Z1.

In the operation of the shunt voltage regulator circuit 140, when the power supply input circuit 100 is initially energized from the current transformers CT1, CT2, CT3 and the associated transformers T1, T2 and T3, the output current from the current auctioneering circuit 110 which includes the bridge rectifier circuits 50, 60 and 70 flows through the resistor R1 to develop a unidirectional voltage which is substantially proportional to only the highest line current in the conductors L1, L2, L3 and to charge the capacitor C1. The voltage across the capacitor C1 increases as the capacitor C1 is charged from the current auctioneering circuit 110 until the voltage across the capacitor C1 is sufficient to cause the Zener diodes Z1 and Z2 to avalanche and limit the voltage across the capacitor C1 to substantially a predetermined value which is equal to the total of the forward voltage drops across the diodes D17 and D18, the reverse avalanche voltages across the Zener diodes Z1 and Z2 and the voltage drops across the base-emitter circuits of the transistors Q1 and Q2. The regulated and filtered voltage across the capacitor C1 which is available between the conductors P1 and N1 may for example be of the order of 33 volts, while the voltage available between the conductor P2 which is connected to the junction point between the diode D18 and the Zener diode Z1 and the common conductor N1 will be less than the voltage between the conductors P1 and N1 by the forward voltage drops across across the diodes D17 and D18. The voltage between the conductors P2 and N1 may, for example, be of the order of 31.5 volts. Similarly, the regulated filtered voltage available between the conductor P3 which is connected at the junction point between the Zener diodes Z1 and Z2 and the common conductor N1 will be less than the voltage between the conductors P1 and N1 by the forward voltage drops across the diodes D17 and D18 and the reverse avalanche voltage across the Zener diode Z1 and may, for example, be of the order of 16 volts.

It is to be noted that in the operation of the shunt voltage regulator circuit 140, after the Zener diodes Z1 and Z2 avalanche during the initial charging of the capacitor C1, any changes in the current flowing through the Zener diodes Z1 and Z2 will be amplified by the current amplifying transistors Q1 and Q2. More specifically, the current which flows through the Zener diodes Z1 and Z2 also flows through the base-emitter circuit of the transistor Q2 and any change in the current which flows through said Zener diodes is amplified and results in a greater change in the collector-emitter current of the transistor Q2 to thereby appear as a change in voltage across the emitter load resistor R2. The change in current flow in the Zener diodes Z1 and Z2 is then further amplified since the change in voltage across the resistor R2 results in a change in the base-emitter current of the transistor Q1 which is further amplified by the change in the collector-emitter current of the transistor Q1. It is important to note that the shunt voltage regulator 140 as disclosed reduces the thermal requirements of the Zener diodes Z1 and Z2 since any change in the current flow required through said Zener diodes to maintain the potentials at the conductors P1, P2 and P3 which is necessary to maintain the voltages at said conductors at the desired regulated values is amplified by the transistors Q1 and Q2.

In order to prevent the operation of the overall protective device shown in FIGS. 1 and 2 prior to the time that the capacitor C1, which may include one or more energy storing capacitors in a particular application, is fully charged or in the event that the capacitor C1 should not be fully charged during the operation of the protective device shown in FIG. 1, the power supply input circuit 100 includes the control means or circuit 150 which comprises the NPN transistors IC1–Q1, which forms part of the semiconductor integrated circuit structure which will be described hereinafter, and Q3 as shown in FIG. 2A. In general, the control means 150 of the power supply input circuit 100 is provided to insure that the capacitor C1 has acquired sufficient charge or stored energy to adequately energize the trip coil 36 of the circuit breaker CB when called upon to do so during the operation of the protective device shown in FIG. 1, as will be explained in greater detail hereinafter. More specifically, the control means 150 of the power supply input circuit 100 includes a voltage dividing network which comprises the resistors R4 and R5 and the Zener diode Z3 which are connected in series with one another, the series circuit being electrically connected between the conductor P3 and the common conductor N1. In order to apply a base drive current to the base of the transistor IC1–Q1 when the capacitor C1 is fully or adequately charged, the base of the transistor IC1–Q1 is connected to the junction point between the resistor R5 and the Zener diode Z3, while the emitter of the transistor IC1–Q1 is connected to the common conductor N1. The collector of the transistor IC1–Q1 is connected to the conductor P1 through a collector load resistor R6 and is also directly connected to the base of the transistor Q3. The emitter of the transistor Q3 is also directly connected to the common conductor N1, while the collector of the transistor Q3 is connected through a conductor 234 to the base of the transistor Q14 through the diode D25 which forms part of the long time delay tripping circuit 200, as shown in FIG. 2A, and also to the collector of the transistor Q24 which forms part of the output circuit 600 as shown in FIG. 2B which is also the junction point between the resistors R52 and R53 at the upper side of the capacitor C22 through a diode D34 for purposes which will be explained in detail hereinafter.

In the operation of the control means 150 prior to the time that the charge on the capacitor C1 and the corresponding voltage thereacross is sufficient to avalanche the Zener diodes Z1 and Z2 in the reverse direction or whenever the charge on the capacitor C1 and the corresponding voltage thereacross is insufficient to avalanche said Zener diodes during the operation of the overall protective device shown in FIG. 1, the current flowing in the base-emitter circuit of the transistor IC1–Q1 will be insufficient to actuate the transistor IC1–Q1 to a saturated current carrying condition and the transistor IC1–Q1 will therefore be substantially nonconducting or cut-off. Whenever the transistor IC1–Q1 is substantially nonconducting or cut-off and a unidirectional output voltage is present at the conductor P1, current will flow from the conductor P1 to the conductor N1 through the resistor R6 and the base-emitter circuit of the transistor Q3 to actuate the transistor Q3 to a saturated condition in which the voltage drop across the collector-emitter ciricuit of the transistor Q3 will be relatively low or negligible and the voltage or potential at the conductor 234 will be very close to the potential at the common conductor N1. Whenever the potential at the conductor 234 is held at a value which is very close to the potential at the common conductor N1, the voltage at the base of the transistor Q14 of the long time delay tripping circuit 200 and at the collector of the transistor Q24 in the output circuit 600 will also be held at the same potential to thereby prevent the operation of either the long time delay tripping circuit 200 or the output circuit 600 of the protective device shown in FIG. 1, as will be explained in detail hereinafter.

In the operation of the control means 150 after the capacitor C1 is fully or adequately or sufficiently charged to avalanche the Zener diodes Z1 and Z2 or whenever the charge on the capacitor C1 and the corresponding voltage thereacross is sufficient to avalanche said Zener diodes in the reverse direction, current will flow through a current carrying path which includes the diodes D17 and D18, the Zener diode Z1, the resistor R4, the Zener diode Z3, and the base-emitter circuit of the transistor IC1–Q1 which is sufficient to actuate the transistor IC1–Q1 to a saturated operating condition in which the current flowing in the collector-emitter circuit of the transistor IC1–Q1 is limited only by the value of the resistor R6 which is connected in series with the collector of the transistor IC1–Q1 and the voltage between the conductors P1 and N1. When the transistor IC1–Q1 is actuated to a saturated condition as just described, the potential at the base of the transistor Q3 will change to a potential which is very close to the potential at the common conductor N1 and the current flow in the base-emitter circuit of the transistor Q3 will be reduced to a value less than that necessary to maintain the transistor Q3 in a saturated condition and the transistor Q3 will therefore be actuated to a substantially nonconducting or cut-off condition. When the transistor Q3 is actuated to a substantially nonconducting or cut-off condition, the potential at the conductor 234 with respect to the potential at the conductor N1 will be raised sufficiently to a value which will permit the long time delay tripping circuit 200 and the output circuit 600 of the protective device shown in FIG. 1 to operate in normal fashion since the capacitor C1 will then be assured a sufficient charge and corresponding voltage thereacross to energize the trip coil 36 of the circuit breaker CB when called upon to do so during the operation of the overall protective device shown in FIG. 1. It is to be noted that the value of the resistor R5 which forms part of the control means 150 may be selected so as to determine the minimum current in the base-emitter circuit of the transistor IC1–Q1 which is necessary to actuate the transistor IC1–Q1 from a substantially nonconducting or cut-off condition to a saturated condition to decrease the sensitivity of the control means 150 where desired in a particular application.

LONG TIME DELAY TRIPPING CIRCUIT 200

In general, the long time delay tripping circuit 200 is connected between the power supply input circuit 100 and the output circuit 600 of the protective device shown in FIG. 1 to respond to the unidirectional voltage developed across the resistor R1 of the auctioneering circuit 110 and the associated voltages which appear at the conductors V1 and V4 to actuate the output circuit 600 to energize the trip coil 36 of the circuit breaker CB and to trip said circuit breaker open whenever the highest of the line currents flowing in the conductors L1, L2 and L3 exceeds a predetermined value after a time delay which varies inversely with substantially the square of the overcurrent over a predetermined range of overcurrents and which is initiated when the highest of the line currents in said conductors exceeds the predetermined or threshold value or level. More specifically, the long time delay tripping circuit 200 includes a substantially constant current source or circuit 210 which is connected to the variable voltage output conductor V4 of the auctioneering circuit 110 for converting the unidirectional voltage across the resistor R1 to a first substantially predetermined unidirectional output current which is maintained at substantially a constant value for a particular value of the unidirectional voltage across the resistor R1 independently of changes in the loads connected at the output of said constant current circuit. The unidirectional output current of the constant current circuit 210 which is substantially proportional to the highest of the line currents in the conductors L1, L2 and L3 is then applied as an input current to a circuit means 220 for producing a second unidirectional output current which varies with substantially the square of the first unidirectional output current from the constant current circuit 210. The circuit means 220 includes a first circuit means 220A which is connected to the constant current circuit 210 for producing an output voltage which varies with substantially the logarithm of the square of the first unidirectional output current from the constant current circuit 210 and a second circuit means 220B. The output voltage of the circuit means 220A is applied to the circuit means 220B which is connected to the circuit means 220A and which is responsive to the output voltage of the circuit means 220A for producing the second unidirectional output current which is substantially the antilogarithm of the logarithm of the square of the first unidirectional output current from the constant current circuit 210. The second unidirectional output current from the circuit means 220B therefore varies with substantially the square of the highest current in the line conductors L1, L2 and L3 and the circuit means 220A considered together with the circuit 220B comprises an overall current squaring circuit 220. The long time delay tripping circuit 200 also includes a second substantially constant current source or circuit 230 which is connected to the conductor P1 for providing a substantially predetermined unidirectional output current which is maintained at substantially a constant value independently of changes in the loads connected at the output of said second constant current circuit. The second constant current circuit 230 is connected in circuit relation with the circuit means 220B and with a timing or integrating capacitor C7 for reasons which will be explained hereinafter.

The second unidirectional output current of the circuit means 220B is applied to a timing or integrating capacitor C7 when permitted by the operation of a level detecting circuit 240 which is connected between the variable voltage conductor V1 and a control means 250 which, in turn, is connected in circuit relation with the circuit means 220B and the second constant current circuit 230 to permit the charging of the capacitor C7 when the highest line current in the conductors L1, L2 and L3 exceeds or increases above a predetermined or threshold overcurrent value. When the level detecting circuit 240 actuates the control means 250 to cause the output current of the circuit means 220B to be applied to charge the capacitor C7, a circuit means 260 is connected to the control means 250 for actuating the control means 250 to permit the charging of the capacitor C7 only in the form of periodic pulses of unidirectional current whose magnitude is equal to that of the second unidirectional output current from the circuit means 220B with the frequency or repetition rate of said pulses being of a fixed or predetermined value which may be adjustable and with each of said pulses of current having substantially a predetermined width or duration. When the circuit means 220B is permitted to charge the capacitor C7 cumulatively by the operation of both the level detecting circuit 240 and the circuit means 260, the charge across the capacitor C7 increases gradually to a predetermined or threshold value after a time delay which varies inversely with substantially the square of the highest line current in the conductors L1, L2 and L3 to actuate the operation of the output circuit 600 of the protective device shown in FIG. 1 to energize the trip coil 36 of the circuit breaker CB to thereby open the contacts of said circuit breaker.

More specifically, the first constant current circuit 210 as shown in FIG. 2A comprises a PNP transistor Q4 and a resistor R7 which is electrically connected in series with the emitter of the transistor Q4 between the variable voltage conductor V2 and the emitter of the transistor Q4. The base of the transistor Q4 is connected to the conductor P2 in order that the input voltage of the constant current circuit 210 between the conductors V2 and P2 include the forward voltage drops of the diodes D17 and D18 to thereby compensate the input voltage of the constant current circuit 210 for the forward voltage drops across the diode D20 and the base-emitter circuit of the transistor Q4. The voltage across the resistor R7 is therefore substantially equal to the voltage across the resistor R1. The emitter current of the transistor Q4 is therefore equal to the ratio of the voltage across the resistor R1 to the value of the resistor R7 which is connected in series with the emitter of the transistor Q4. The unidirectional output current of the constant current circuit 210 is available at the collector of the transistor Q4 which is connected to the circuit means 220A through the resistor R8 which assists in limiting current during noise or voltage spikes. The resistor R11 may be connected between the variable voltage conductor V2 and the lower end of the resistor R8 in order to adjust the timing out of long time delay tripping circuit 200 for relatively long time delays.

In order to maintain the unidirectional output current of the constant current circuit 210 at substantially a predetermined value for a particular value of the voltage across the resistor R1, the input voltage applied across the series circuit which includes the resistor R7 and the emitter-base circuit of the transistor Q4 should be relatively high, such as in the order of ten to twenty times the forward voltage drop across the emitter-base circuit of the transistor Q4. In addition, the transistor Q4 should have a relatively high current gain or ratio of emitter current to base current, such as of the order of 100 at the particular level of output current at which the transistor Q4 is operating in order that the base current of the transistor Q4 be negligible compared with the emitter current and to insure that the collector current of the transistor Q4 be substantially equal to the emitter current. In the operation of the constant current circuit 210, the unidirectional output current at the collector of the transistor Q4 is maintained at substantially a predetermined or constant value for a particular value of the voltage across the resistor R1 independent of changes in the load circuit which is connected to the collector of the transistor Q4 and the unidirectional output current at the collector of the transistor Q4 is substantially proportional to the voltage across the resistor R1 and, in turn, to the highest line current in the conductors L1, L2 and L3. It is to be noted that the output current of the constant current circuit 210 which flows in the collector of the transistor Q4 is applied as an input current to the circuit means 220 to which the collector of the transistor Q4 is connected through the resistor R8. The latter input current to the circuit means 20 is indiacted in FIG. 2A as $I_1$.

In general, the circuit means 220 is connected to the constant current circuit 210 for producing a second unidirectional output current which is substantially proportional to the square of the input current $I_1$ applied to the circuit means 220 from the constant current circuit 210 which, in turn, is substantially proportional to the highest line current in the conductors L1, L2 and L3. More specifically, the circuit means 220 includes a first circuit means 220A which is connected to the constant current circuit 210 for producing an output voltage which is substantially proportional to the natural logarithm of the square of the output current $I_1$ from the constant current circuit 210 and, in turn, is substantially proportional to the natural logarithm of the square of the highest line current in the conductors L1, L2 and L3. In addition, the circuit means 220 includes a second circuit means 220B which is connected to the circuit means 220A to be responsive to the output voltage of the circuit means 220A for producing a second unidirectional output current as indicated at $I_0$ in FIG. 2A which is substantially the antilogarithm of the natural logarithm of the square of the first output current from the constant current circuit 210 which is applied to or coupled to circuit means 220A as the input current $I_1$. The circuit means 220 preferably comprises a unitary monolithic semiconductor or silicon integrated circuit structure or chip which includes at least first and second pairs of transistors which are illustrated as being of the NPN type with the doping level of each of said transistors being substantially equal. The integrated circuit structure IC1 may also include a fifth transistor IC1–Q1 which, as illustrated, is of the NPN type and which may form part of the control means 150 as previously described. An example of a commercially available integrated circuit structure which may be employed as the integrated circuit structure IC1 in practicing the invention is identified as the RCA Type No. CA3045. It is important to note that since the plurality of NPN transistors which form the integrated circuit structure IC1 are all subject to substantially the same environmental temperature conditions, certain temperature compensating problems that might otherwise be present are substantially reduced or eliminated.

The first circuit means 220A of the overall circuit means 220 comprises the NPN transistors IC1–Q3 and IC1–Q2 of the integrated circuit structure IC1. The emitter-base circuit of the transistor IC1–Q3 is connected in series with the collector of the transistor Q4 of the constant current circuit 210 through the resistor R8 with the collector of the transistor IC1–Q3 being connected to the base of the transistor IC1–Q3 and also to the collector of the transistor Q4 through the resistor R8. The base-emitter circuit of the transistor IC1–Q2 is connected in series circuit relation with the base-emitter circuit of the transistor IC1–Q2. More specifically, the emitter of the transistor IC–1Q3 is connected to the base of the transistor IC1–Q2 whose collector is also connected to the base of the transistor IC1–Q2. The emitter of the transistor IC1–Q2 is connected to the common conductor N1. The unidirectional output voltage of the circuit means 220A, as indicated at $V_0$ in FIG. 2A, is available between the base of the transistor IC1–Q3 and the emitter of the transistor IC1–Q2 which is also connected to the common conductor N1.

The operation of the circuit means 220A is based upon the relationship between the emitter current ($I_E$) and the base-emitter voltage ($V_{B-E}$) of a silicon transistor which is expressed by the following equation:

(1) $$V_{B-E} = (kT/q)\ln(I_E/I_S)$$

wherein:

$q$ = the electron charge in coulombs
$I_S$ = saturation current of the emitter-base circuit of the transistor in amperes
$V_{B-E}$ = the base-emitter voltage of the transistor
$k$ = Boltzmann's constant
$T$ = the absolute temperature.

Figure 3:
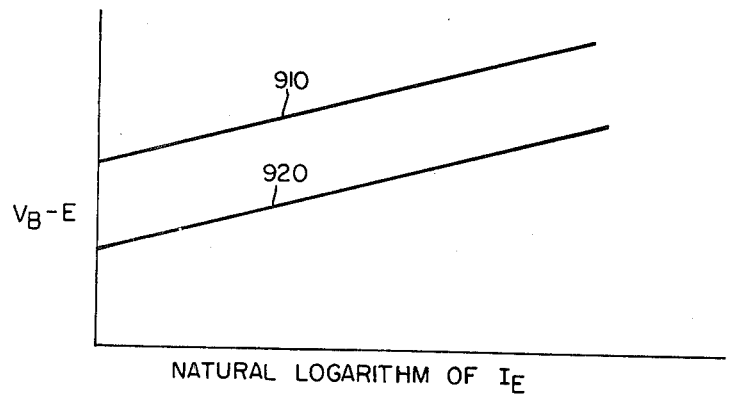
FIG. 3 is a graphical representation of the relationship between the voltage across and the current through the base-emitter circuit of a transistor which may form part of the protective delay device or circuit shown in FIG. 1.

The relationship indicated Equation 1 is illustrated graphically in FIG. 3 by the curves 910 and 920 which illustrate the variation of $V_{B-E}$ with the emitter current $I_E$ and which are representative of different types of discrete or separate silicon transistors having different saturation currents in the emitter-base circuits which may vary in accordance with the doping level of different types of semiconductor material included in such discrete transistors. It is to be noted that the curves 910 and 920 associated with different discrete transistors both vary as a function of temperature and that the slopes of said curves are substantially equal. It has been found that the slopes of the curves 910 and 920 associated with all types of silicon transistors is substantially the same, as indicated by the term $KT/q$, and that the ordinates on the vertical axis of the graph shown in FIG. 3 for the different curves 910 and 920 vary with the saturation current of the particular discrete transistors for which the curves are drawn. It is also important to note that the relationship between the base-emitter voltage of discrete silicon transistors as indicated by the curves 910 and 920 and the saturation current of the emitter-base circuit of each transistor is substantially linear over a predetermined range of emitter current. Since the transistors IC1–Q2 and IC1–Q3 are formed as part of the integrated circuit structure IC1 and have substantially the same doping levels, the saturation current of both of said transistors are substantially equal.

Referring again to FIG. 2A, the output voltage $V_0$ of the circuit means 220A which appears between the base of the transistor IC1–Q3 and the emitter of the transistor IC1–Q2 is equal to the sum of the base-emitter voltages of the transistors IC1–Q2 and IC1–Q3. This relationship is expressed by the following equation:

(2) $$V_0 = V_{Q2} + V_{Q3}$$

wherein:

$V_{Q2}$ = the base-emitter voltage of the transistor IC1–Q2
$V_{Q3}$ = the base-emitter voltage of the transistor IC1–Q3

Substituting for the base-emitter voltages of the transistors IC1–Q2 and IC1–Q3 in Equation 2 in accordance with Equation 1 results in the following equation:

(3) $$V_0 = K_1 \ln K_{Q2} I_1 + K_1 \ln K_{Q3} I_1$$

wherein:

$K_1 = kT/q$
$K_{Q2} = 1/I_S$ associated with the transistor IC1–Q2
$K_{Q3} = 1/I_S$ associated with the transistor IC1–Q3
$I_1$ = the emitter current for both of said transistors and the output current of the constant current circuit 210.

Rearranging Equation 3, (4) $$V_0 = K_1 \ln(K_{Q2} K_{Q3} I_1^2)$$

As indicated by Equation 4, the output voltage $V_0$ of the circuit means 220A is substantially proportional to the natural logarithm of the input current $I_1^2$. It is important to note that since the doping levels of the transistors IC1–Q2 and IC1–Q3 are substantially equal, the curves associated with said transistors are substantially identical such as indicated at 910 in FIG. 3 and that the curves may move vertically upwardly and downwardly as a function of the environmental temperature to positions which are substantially parallel to those shown in FIG. 3. In addition, it is to be noted that the output voltage $V_0$ of the circuit means 220A as indicated in Equation 4 may also vary as a function of temperature since the term $(K_{Q2} K_{Q3})$ varies with the saturation currents of the transistors IC1–Q2 and IC1–Q3 which are substantially equal and $K_1$ also varies with temperature.

As previously mentioned, the circuit means 220B is connected to the circuit means 220A to be responsive to the output voltage $V_0$ of the circuit means 220A for producing a unidirectional output current, as indicated at $I_0$ in FIG. 2A, which is substantially the antilogarithm of the natural logarithm of the square of the output current $I_1$ from the constant current circuit 210. More specifically, the circuit means 220B comprises the second pair of NPN transistors IC1–Q4 and IC1–Q5 which form part of the integrated circuit structure IC1. The emitter of the transistor IC1–Q5 is connected to the emitter of the transistor IC1–Q2 of the circuit means 220A through the common conductor N1. The base-emitter circuit of the transistor IC1–Q5 is connected in series circuit relation with the base-emitter circuit of the transistor IC1–Q4 with the base of the transistor IC1–Q5 being directly connected to the emitter of the transistor IC1–Q4. The transistor IC1–Q5 is effectively connected as a diode with the collector of said transistor being connected directly to the base thereof. The base of the transistor IC1–Q4 is connected to the base of the transistor IC1–Q3 of the circuit means 220A, while the collector of the transistor IC1–Q4 is connected to the conductor P3 through a series circuit which includes the emitter-collector circuit of the transistor Q6 and the diode D21 which form part of the control means 250 for reasons which will be explained in detail hereinafter. The collector of the transistor IC1–Q4 is also connected to the lower side of a timing or integrating capacitor C7 through the diode D22 and to the base of the transistor Q8 which forms part of the control means 270 through the diode D23 for reasons which will be explained hereinafter. The output current $I_0$ of the circuit means 220B is available at the collector of the transistor IC1–Q4 as indicated in FIG. 2A.

In order to apply a substantially constant or predetermined current to the base-emitter circuit of the transistor IC1–Q5 to assist in temperature compensating the current squaring circuit 220, a second constant current source or circuit 230 is connected in circuit relation between the conductor P1 and the circuit means 220B. More specifically, the constant current circuit 230 comprises the PNP transistor Q7 and the resistor R13 which is electrically connected in series with the emitter of the transistor Q7 between the conductor P1 and the emitter of the transistor Q7. The base of the transistor Q7 is connected to the conductor P3 in order to maintain the output current of the constant current circuit 230 at substantially a predetermined or reference value. The emitter current of the transistor Q7 is therefore equal to the ratio of the voltage across the resistor R13, which is equal to the difference between the regulated potentials at the conductors P1 and P3 less the diode drop across the emitter-base circuit of the transistor T7, to the value of the resistor R13. The unidirectional output current at the constant current circuit 230 is available at the collector of the transistor Q7 which is connected to the base-emitter circuit of the transistor IC1–Q5 of the circuit means 220B through the series circuit which includes the Zener diodes Z5 and Z4. The collector of the transistor Q7 is also connected to the upper side of the timing or integrating capacitor C7 and to the common conductor N1 through the diode D26 and the emitter-collector circuit of the transistor Q9 which forms part of the level detecting circuit 240 for reasons which will be explained hereinafter.

In the operation of the second circuit means 220B of the overall circuit means 220, it will be assumed that the transistor Q6 of the control means 250 is in a normally saturated condition and that the diode D21 is in a normally forward biased condition. In the operation of the circuit means 220B as indicated in FIG. 2A, the output voltage $V_0$ of the circuit means 220A is applied as an input signal to the circuit means 220B across the series circuit which includes the base-emitter circuits of the transistors IC1–Q4 and IC1–Q5.

Since the output voltage of the circuit means 220A as indicated at $V_0$, is substantially equal to the sum of the base-emitter voltages of the transistors IC1–Q4 and IC1–Q5 whose base-emitter circuits are electrically connected in series as previously described, the relationship between the output voltage $V_0$ of the circuit means 220A and the base-emitter voltages of the transistors IC1–Q4 and IC1–Q5 can therefore be expressed by the following equation:

(5) $\quad V_0 = V_{Q4} + V_{Q5}$

Based upon the relationship between the emitter current and the base-emitter voltages of the transistors IC1–Q4 and IC1–Q5 as previously set forth in Equations 1 and 3 in connection with the operation of the circuit means 220B, Equation 5 can be rewritten as follows:

(6) $\quad V_0 = K_1 \ln K_{Q5} I_C + K_1 \ln K_{Q4} I_0$ wherein:

$K_1 = kT/q$
$K_{Q5} = 1/I_s$ associated with the transistor IC1–Q5
$I_C =$ the substantially constant current applied to the base-emitter circuit of the transistor IC1–Q5
$K_{Q4} = 1/I_s$ associated with the transistor IC1–Q4
$I_0 =$ the output current of the circuit means 220B at the collector of the transistor IC1–Q4 which is substantially equal to the emitter current of the transistor IC1–Q4.

Taking the antilogarithms of the right-hand portions of Equations 3 and 6 which are both equal to the same quantity $V_0$, the following equation is obtained:

(7) $\quad (K_{Q2}K_{Q3})I_1^2 = (K_{Q5}I_C)(K_{Q4}I_0)$

Rearranging Equation 7 the following result is obtained:

(8) $\quad I_0 = (K_{Q2}K_{Q3})/(K_{Q4}K_{Q5}) I_1^2 / I_C$

Considering Equation 8, the output current $I_0$ of the circuit means 220B is therefore substantially proportional to the antilogarithm of the natural logarithm of $I_1^2$ at the collector of the transistor IC1–Q4 or is substantially proportional to $I_1^2$.

In the overall operation of the current squaring circuit 220 which includes the circuit means 220A and the circuit 220B, the transistor IC1–Q5 which forms part of the integrated circuit structure IC1 is connected to assist in temperature compensating the operation of the current squaring circuit 220. More specifically, referring to Equation 8 above, the overall gain factor of the current squaring circuit 220 which is the ratio of the overall gain factor of the current squaring circuit 220 which is the ratio of the product $K_{Q2}K_{Q3}$ to the product $K_{Q4}K_{Q5}$ is a function of certain parameters associated with the integrated circuit structure IC1 such as the doping levels and physical dimensions of each of the transistors IC1–Q2, IC1–Q3, IC1–Q4 and IC1–Q5. By embodying all of the latter transistors in a unitary monolithic silicon integrated circuit structure or chip, the doping levels of said transistors are substantially equal and thus the overall gain factor as just defined is nearly equal to unity. In addition, variations in the above gain factor with temperature are substantially completely eliminated because each of the transistors involved has substantially the same temperature coefficient. In other words, when the above constants which are associated with the respective transistors IC1–Q2, IC1–Q3, IC1–Q4 and IC1–Q5 and which are inversely proportional to the saturation current of said transistors vary as a function of the environmental temperature, the changes in the saturation currents of the transistors IC1–Q2 and IC1–Q3 are substantially compensated for by the corresponding changes in the saturation currents of the transistors IC1–Q4 and IC1–Q5 as indicated in Equation 8 to thereby maintain the accuracy of the overall current squaring circuit 220. The use of a monolithic silicon integrated circuit structure IC1 also reduces or substantially eliminates certain calibration problems that would otherwise result if discrete transistor components were employed rather than the first and second pairs of transistors which are embodied in the unitary integrated circuit structure IC1.

In general, the level detecting circuit 240 and the control means 250 of the long time delay tripping circuit 200 are connected in circuit relation with the auctioneering circuit 110, the timing or integrating capacitor C7 and the current squaring circuit 220 to respond to the instantaneous unidirectional voltage across the resistor R1 and, in turn, to the highest instantaneous line current flowing in the conductors L1, L2 and L3 to normally prevent the circuit means 220 from charging the timing capacitor C7 as long as the highest instantaneous line current in said conductors is below a predetermined value or level as described in greater detail in U.S. Pat. No. 3,590,326 which issued June 29, 1971 to John D. Watson. The level detecting circuit 240 includes the PNP transistors Q10 and Q11 which are connected to control the conducting state of a PNP transistor Q9 which, in turn, is connected to control the conducting state of the control means 250 which includes the PNP transistors Q5 and Q6 and which is connected to normally divert the output current in the circuit means 220 away from the timing capacitor C7.

More specifically, the input circuit of the level detecting circuit 240 comprises a voltage dividing network which includes the rheostat or variable resistance means RP2, the resistor R23 and the resistor R21 which are connected in series with one another, the series circuit being connected between the variable voltage output conductor V1 of the auctioneering circuit 110 and the positive conductor P3 which provides one of the regulated unidirectional output voltages from the power supply input circuit 100.

It is important to note that the unidirectional voltage at the variable voltage conductor V1 varies instantaneously with only the highest line current in the conductors L1, L2 and L3 which corresponds to the instantaneous voltage across the resistor R1 since the voltage at the conductor V1 is not filtered by the capacitor C6 as is the output voltage at the variable voltage conductor V3. The base of the transistor Q11 is connected to the junction point between the resistors R23 and R21, while the emitter of the transistor Q11 is connected to the positive conductor P1. The diode D28 is connected between the base and the emitter of the transistor Q11 to limit the inverse voltage which is applied between the emitter and the base of the transistor Q11 when the transistor Q11 is substantially nonconducting or cut-off and to prevent the base-emitter circuit of the transistor Q11 from breaking down under the inverse voltage which might otherwise to applied to the base-emitter circuit of the transistor Q11. The collector of the transistor Q11 is connected to the common conductor N1 through the collector load resistor R18. The transistor Q10 is directly coupled to the output of the transistor Q11 since the base of the transistor Q10 is connected to the collector of the transistor Q11, while the emitter of the transistor Q10 is directly connected to the positive conductor P1. The collector of the transistor Q10 is connected to the common conductor N1 through the collector load resistor R17. The capacitor C8 is connected between the emitter and the collector of the transistor Q10 to cooperate with the resistor R17 to delay the resetting of the level detecting circuit 240, as will be explained hereinafter. The transistor Q9 which comprises the control means 280 is directly coupled to the transistor Q10 with the collector of the transistor Q10 being connected to the base of the transistor Q9. The collector of the transistor Q9 is connected to the common conductor N1 through the base-emitter circuit of the transistor Q5 which forms part of the control means 250. The emitter of the transistor Q9 is connected to the output of the constant current circuit 230 at the collector of the transistor Q7 through the diode D26 and also to the upper side of the timing capacitor C7. The resistor R16 is connected between the base and the emitter of the transistor Q9 to decrease the sensitivity of operation of the transistor Q9 and to establish the minimum emitter-base drive current necessary to actuate the transistor Q9 between nonconducting and saturated operating conditions.

As previously mentioned, the control means 250 is connected in circuit relation with the level detecting circuit 240, the timing capacitor C7 and the current squaring circuit 220 to respond to the operating conditions of the level detecting circuit 240 to normally prevent the output current $I_0$ of the circuit means 220B from being applied to charge the timing capacitor C7, as long as the highest line current flowing in the line conductors L1, L2 and L3 remains below a predetermined value and to permit the charging of the capacitor C7 by the output current $I_0$ only when the highest line current exceeds said predetermined value. More specifically, the control means 250 comprises the NPN transistor Q5 and the PNP transistor Q6. As shown in FIG. 2A, the emitter of the transistor Q5 is directly connected to the common conductor N1, while the base of the transistor Q5 is connected both to the collector of the transistor Q9 to respond to the operation of the level detecting circuit 240 and also to the junction point of the diode D27 and the resistor R20 which form part of the circuit means 260 to respond to the operation of the circuit means 260 during certain operating conditions, as will be explained hereinafter. The collector of the transistor Q5 is connected to the conductor P3 through the series circuit which includes the resistors R9 and R10 and to the base of the transistor Q6 which is connected to the junction point between the resistors R9 and R10. The emitter of the transistor Q6 is connected to the positive conductor P3, while the collector of the transistor Q6 is connected to the collector of the transistor IC1-Q4, which forms part of the current squaring circuit 220 through the diode D21 and also to the common conductor N1 through the collector load resistor R12 which is provided to insure that a collector current flows in the emitter-collector circuit of the transistor Q6 even during certain operating conditions of the current squaring circuit 220 when the current through the transistor IC1-Q4 is relatively low and to insure that the transistor Q6 will be actuated to a substantially nonconducting condition by the level detecting circuit when actuated by the level detecting circuit 240.

In the operation of the level detecting circuit 240 and the associated control means 280 and 290, when the highest instantaneous line current flowing in the conductors L1, L2 and L3 is less than substantially a predetermined value and the corresponding instantaneous unidirectional voltage across the resistor R1 is less than a substantially predetermined voltage, the transistor Q11 of the level detecting circuit 240 is actuated to substantially a saturated condition. This is because the emitter-base circuit of the transistor Q11 is forward biased and a base drive current flows from the positive conductor P1 through the emitter-base circuit of the transistor Q11 and the resistor R21 to the positive conductor P3. When the transistor Q11 is in the normally saturated condition, the voltage drop across the resistor R21 due to the current which flows in the rheostat RP2 and the resistor R23 and the current which flows in the emitter-base circuit of the transistor Q11 is equal to the voltage difference between the conductors P1 and P3 less the forward voltage drop across the emitter-base circuit of the transistor Q11. For example, if the unidirectional voltage at the conductor P1 is 33 volts which is positive with respect to the potential at the common conductor N1 and the voltage at the conductor P3 is 16.5 volts positive with respect to the common conductor N1, the voltage across the resistor R21 will be 16.5 volts less the forward voltage drop across the emitter-base circuit of the transistor Q11 or will be approximately 16 volts. In other words, when the transistor Q11 is in a normally saturated condition, the voltage at the base of the transistor Q11 will differ from the voltage at the positive conductor P1 only by the forward voltage drop of the emitter-base circuit of the transistor Q11. The sum of the instantaneous voltage drops across the rheostat RP2 and the resistor R23 will be substantially equal to the unidirectional voltage across the resistor R1 since the rheostat RP2 and the resistor R23 are connected in series with each other between the conductor V1 and the base of the transistor Q11 which normally differs from the voltage at the conductor P1 by the forward voltage drop across the emitter-base circuit of the transistor Q11. The forward voltage drop across the diode D19 will substantially compensate for the voltage drop across the emitter-base circuit of the transistor Q11 and will assist in temperature compensating the level detecting circuit 240 for the variations which may occur in the forward drop across the emitter-base circuit of the transistor Q11 due to any changes in the environmental temperature. Since the sum of the voltage drops across the rheostat RP2 and the resistor R23 is substantially equal to the unidirectional voltage across resistor R1, the current flowing through the rheostat RP2 and the resistor R23 will be equal to the unidirectional voltage across the resistor R1 divided by the sum of the resistances of the rheostat RP2 and the resistor R23.

During the operation of the level detecting circuit 240, as the unidirectional voltage across resistor R1 increases prior to reaching the predetermined voltage previously mentioned, the current which flows through the rheostat RP2 and the resistor R23 increases, while the current which flows through the emitter-base circuit of the transistor Q11 decreases. This is because the voltage across the resistor R21 is constrained to be equal to the voltage difference between the conductors P1 and P3 less the forward voltage drop across the emitter-base circuit of the transistor Q11 as long as the transistor Q11 remains in a saturated condition. While the transistor Q11 remains in a saturated condition, the current which flows from the positive conductor P1 through the resistor R18 will flow through the emitter-collector circuit of the transistor Q11 rather than through the emitter-base circuit of the transistor Q10 and maintain the transistor Q10 in a substantially nonconducting or cut-off condition. As long as the transistor Q10 is maintained in a substantially nonconducting condition, the current flow through the emitter-collector circuit of the transistor Q10 will be substantially negligible and the voltage drop across the resistor R17 will be relatively low. The voltage at the base of the transistor Q9 will therefore be at a value which is relatively close to the voltage at the common conductor N1 and a base drive current will flow from the positive conductor P1 through the resistor R13, the emitter-collector circuit of the transistor Q7 of the constant current circuit 230, the diode D26, the emitter-base circuit of the transistor Q9 and the resistor R17 to the common conductor N1. The transistor Q9 will, therefore, be maintained in a substantially saturated condition whenever the transistor Q10 of the level detecting circuit is in a substantially nonconducting condition and a low resistance current path will be provided by the emitter-collector circuit of the transistor Q9 from the collector of the transistor Q7 of the constant current circuit 230 through the diode D26, the emitter-collector circuit of the transistor Q9 and the base-emitter circuit of the transistor Q5 of the control means 250 to the common conductor N1. A small portion of the output current of the constant current circuit 230 will then flow from the collector of the transistor Q7 through the current path just indicated to provide a base drive current to the transistor Q5 which will normally maintain the transistor Q5 in a saturated condition. When the transistor Q5 is maintained in a saturated condition, current will flow from the conductor P3 through the resistors R9 and R10 and the collector-emitter circuit of the transistor Q5 to the common conductor N1. When the transistor Q5 is maintained in the normally saturated condition, the voltage drop across the resistor R9 due to the current which flows through the collector-emitter circuit of the transistor Q5 will result in the application of a base drive current to the emitter-base circuit of the transistor Q6 which will also actuate the transistor Q6 to a saturated condition. As long as the transistor Q6 of the control means 250 remains in a saturated condition, the emitter-collector circuit of the transistor Q6 will provide a low resistance current carrying path from the conductor P3 to the collector of the transistor IC1-Q4 of the circuit means 220B through the diode D21 which will be forward biased and the output current $I_0$ of the current squaring circuit 220 will flow from the positive conductor P3 through the emitter-collector path of the transistor Q6 rather than through a current carrying path which would charge the timing capacitor C7. This is because whenever the transistor Q6 is in a saturated operating condition, the transistor D21 will be forward biased and the diode D22 which is connected to the lower side of the timing capacitor C7 will be reverse biased and prevent the flow of charging current to the timing capacitor C7.

In summary, in the operation of the level detecting circuit 240, whenever the highest line current in the conductors L1, L2 and L3 is below a predetermined or threshold value which is determined by the setting of the rheostat RP2, the transistor Q11 will remain in a normally saturated condition, the transistor Q10 will remain in a normally substantially nonconducting condition, the transistor Q9 which forms the control means 280 will remain in a normally conducting or saturated condition, and the transistors Q5 and Q6 of the control means 250 will remain in normally conducting or saturated conditions to prevent the flow of charging current to the timing capacitor C7 as just described. It is to be noted that as long as the transistor Q10 remains in a normally substantially nonconducting condition, the capacitor C8 will charge to a voltage which is substantially equal to the voltage difference between the positive conductor P1 and the common conductor N1 less a relatively small voltage drop across the resistor R17.

When the highest instantaneous line current flowing the conductors L1, L2 and L3 exceeds or increases to a value above the predetermined value to which the level detecting circuit 240 is adjusted to respond by the setting of the rheostat RP2 and the unidirectional instantaneous voltage across the resistor R1 exceeds a corresponding predetermined voltage value, the current through the rheostat RP2 and the resistor R23 increases while the transistor Q11 is still in a saturated condition until the current in the emitter-base circuit of the transistor Q11 decreases to a negligible value and the transistor Q11 is actuated to a substantially nonconducting condition. When the transistor Q11 is actuated to a substantially nonconducting condition, the current in the emitter-collector circuit of the transistor Q11 decreases to a substantially negligible value and the current which flows in the resistor R18 will be diverted to a current path which extends from the positive conductor P1 through the emitter-base circuit of the transistor Q10 and the resistor R17 to the common conductor N1. The transistor Q10 is then actuated to a saturated operating condition and carries saturated current in the emitter-collector circuit of said transistor to increase the voltage drop across the resistor R17. The voltage at the base of the transistor Q9 which is connected to the upper end of the resistor R17 then increases to a value which is substantially equal to the voltage at the emitter of the transistor Q9 to thereby remove the forward bias of the emitter-base circuit of the transistor Q9 and actuate the transistor Q9 to a substantially nonconducting condition. When the transistor Q9 is actuated to a substantially nonconducting condition, the base drive current which normally flows through the emitter-collector circuit of the transistor Q9 to the base-emitter circuit of the transistor Q5 is effectively removed and the transistor Q5 is also actuated to a substantially nonconducting condition. When the transistor Q5 is actuated to a substantially nonconducting condition, the current which flows in the collector-emitter circuit of the transistor Q5 is reduced to a negligible value and the voltage drop across the resistor R9 decreases correspondingly to thereby effectively remove the base drive current from the emitter-base circuit of the transistor Q6 which is also actuated to a substantially nonconducting condition. When the transistor Q6 is actuated to a substantially nonconducting condition, the diode D21 becomes reverse biased and the output current $I_0$ of the circuit means 220B can no longer flow from the positive conductor P3 through the current path which previously included the emitter-collector circuit of the transistor Q5 and the diode D21. When the transistor Q6 is actuated to a substantially nonconducting condition, the diode D22 which is connected to the lower side of the timing capacitor C7 is also actuated to a forward biased operating condition to thereby permit charging current to flow to the timing capacitor C7 which is equal to the output current $I_0$ of the circuit means 220B and which flows from the positive conductor P1 through a current carrying path which includes the resistor R13, the emitter-collector circuit of the transistor Q7, the diode D22, the collector-emitter circuit of the transistor IC1-Q4 and the base-emitter circuit of the transistor IC1-Q5 to the common conductor N1 when also permitted by the operation of the circuit means 260 as will be described hereinafter.

When the transistor Q10 is actuated to a substantially saturated condition in response to a predetermined overload current flowing in one of the line conductors L1, L2 and L3, the capacitor C8 which was previously charged up to a voltage equal to the difference in voltage between the conductors P1 and N1 less the voltage drop across the resistor R17 will rapidly discharge through the emitter-collector path of the transistor Q10 until the capacitor C8 is substantially completely discharged. If the highest current flowing in the line conductors L1, L2 and L3 and the corresponding unidirectional voltage across the resistor R1 should instantaneously decrease to a value below the predetermined or threshold value after the level detecting circuit 240 has operated to actuate the transistor Q9 to a substantially nonconducting condition and to prevent the transistor Q9 from being actuated to a substantially saturated condition, the transistor Q11 will be restored substantially instantaneously to a saturated condition, and the transistor Q10 will be returned substantially instantaneously to a substantially nonconducting condition. Since the sum of the voltage drops across the capacitor C8 and the resistor R17 is equal to the voltage difference between the conductors P1 and N1, the voltage across the capacitor C8 following its discharge by the actuating of the transistor Q10 to a substantially saturated condition and the subsequent return of the transistor Q10 to a substantially nonconducting condition as just indicated will increase relatively slowly after the transistor Q10 is restored to a substantially nonconducting condition due to the presence of the resistor R17 in the charging path of the capacitor C8. The charging current which flows to the capacitor C8 from the conductor P1 after the transistor Q10 is returned to a substantially nonconducting condition will produce a gradually decreasing voltage drop across the resistor R17 which is sufficient to maintain the transistor Q9 in a substantially nonconducting condition for a predetermined time delay after the highest instantaneous current in one of the conductors L1, L2 and L3 and the corresponding voltage across the resistor R1 decreases below the predetermined values necessary to actuate the level detecting circuit 240. In other words, if the highest instantaneous line current flowing in the conductors L1, L2 and L3 should exceed a predetermined over current value and then instantaneously decrease below the predetermined instantaneous value, the transistor Q9 will be prevented from being actuated to a substantially saturated condition and will be maintained in a substantially nonconducting condition by the timing circuit which includes the capacitor C8 and the resistor R17 which will delay the resetting of the level detecting circuit 240 for predetermined time delay following the decrease of the highest instantaneous current below the predetermined value. The time delay may for example be slightly longer than the time duration of one half cycle of the alternating current which flows in the conductors L1, L2 and L3 as explained in greater detail in U.S. Pat. No. 3,590,326 previously mentioned.

In general, the circuit means 260 is connected to the control means 250 and the current the squaring circuit 220 to control the application of the unidirectional output current $I_0$ from the circuit means 220B to the timing capacitor C7 in the form of periodic pulses of current having a predetermined or constant frequency or repetition rate, which may be adjustable, and having a predetermined or constant width or duration and of a magnitude which is substantially proportional to the square of the highest line current in the conductors L1, L2 and L3 when permitted to do so by the operation of the level detecting circuit 240 when the transistor Q9 is actuated to a substantially nonconducting condition. Whenever the transistor Q9 is actuated to a substantially nonconducting condition by the operation of the level detecting circuit 240, the circuit means 260 effectively takes over control of the conducting states of the transistors Q5 and Q6 of the control means 250 and, in turn, controls the application of the output current $I_0$ of the circuit means 220B to the timing capacitor C7.

More specifically, the circuit means 260 comprises a breakover device such as the unijunction transistor or double base diode Q12 and the energy storing capacitor C9. It is to be noted, as previously mentioned, that the unidirectional regulated potential at the conductor P1 may for example be approximately 33 volts which is positive with respect to the potential at the common conductor N1, while the unidirectional regulated potential at the conductor P8 may for example be approximately one-half the voltage at the conductor P1 or may, for example, be a voltage of approximately 16.5 volts which is positive with respect to the potential at the common conductor N1. The lower base of the unijunction transistor Q12 is connected directly to the common conductor N1, while the upper base of the transistor Q12 is connected to the conductor P3 through the resistor R25 to apply a substantially predetermined or constant interbase potential to the unijunction transistor Q12 prior to the breakover of the transistor Q12. The emitter of the transistor Q12 is connected to the right side of the capacitor C9 at the terminal 251, as shown in FIG. 2A and also through a series circuit which includes the resistor R22 and the rheostat RP1 to the conductor P1. The left side of the capacitor C9 at the terminal 253 is connected to the conductor P1 through the resistor R19 and also to the base of the transistor Q5 of the control means 250 through the diode D27. The base of the transistor Q5 is also connected to the common conductor N1 through the resistor R20 which acts as a shunt resistor electrically connected in parallel with the base-emitter circuit of the transistor Q5 to decrease the sensitivity of the operation of the transistor Q5 and to establish the minimum current in the base-emitter circuit of the transistor Q5 necessary to actuate the transistor Q5 from a normally nonconducting or cut off condition to a saturated or substantially conducting condition. It is to be noted that the resistor R25 which is connected between the upper base of the unijunction transistor Q12 and the conductor P3 also assists in temperature compensating the circuit means 260 for changes in the operating characteristics of the unijunction transistor Q12 which result from changes in the environmental temperature.

In general, the circuit means 260 operates as a relaxation oscillator or sawtooth voltage generator which depends upon the operating characteristics of the particular breakover device which is employed as part of the circuit means 260 and which as illustrated is the unijunction transistor Q12. The typical operating characteristics of a suitable breakover device such as the unijunction transistor Q12, a four-layer diode, a transistor breakover circuit or other suitable circuit is such that when the voltage or potential applied between certain terminals such as the emitter and the lower base of the transistor Q12 exceeds subsantially a predetermined fraction or percentage of the potential applied between other terminals such as the upper base and the lower base of the transistor Q12 which may be referred to as the peak point voltage of the transistor Q12, the resistance or impedance between the emitter and the lower base of the transistor Q12 will decrease suddenly until the voltage between the emitter and the lower base of the transistor Q12 decreases to a relatively much lower voltage which may be referred to as the valley voltage of the transistor Q12, as disclosed in greater detail in copending application Ser. No. 47,625, filed June 18, 1970, by John D. Watson et al.

In considering the detailed operation of the circuit means 260, it will be assumed initially that the transistor Q9 has been actuated to a substantially non-conducting condition by the operation of the level detecting circuit 240 and that the voltage applied between the emitter and the lower base of the transistor Q12 is less than the peak point voltage necessary to cause the transistor Q12 to breakover and that the transistor Q5 is being held in a substantially saturated condition by the operation of the circuit means 260 and, more specifically by the base drive current which flows from the positive conductor P1 through the resistor R19, the forward connected diode D27 and the base-emitter circuit of the transistor Q5 to the common conductor N1. It is to be noted that during the assumed initial operating condition, the left side of the capacitor C9 at the terminal 253 will be held or clamped at a positive potential with respect to the common conductor N1 which is equal to the sum of the forward voltage drops across the diode D27 and the base-emitter circuit of the transistor Q5. It is also to be noted that the unidirectional output current $I_0$ of the circuit means 220B will be diverted away from or bypassed around the timing capacitor C7 through the emitter-collector path of the transistor Q6 and the diode D21 as long as the diode D27 is forward biased and the transistor Q5 which controls the conducting state of the transistor Q6 as previously explained is held in a saturated operating condition.

In the operation of the circuit means 260, prior to the breakover of the unijunction transistor Q12, a charging current will flow to the right side of the capacitor C9 from the conductor P1 through the rheostat RP1 and the resistor R22 to gradually charge the capacitor C9 in a substantially linear manner until the voltage at the terminal 251 at the right side of the capacitor C9 exceeds the peak point voltage of the unijunction transistor Q12. When the voltage at the terminal 251 exceeds the peak point voltage of the transistor Q12, the transistor Q12 breaks over and the voltage at terminal 251 at the right side of the capacitor C9 suddenly decreases from the peak point voltage to the valley voltage of the transistor Q12 with a resulting voltage change at the terminal 251 which is equal to the difference between the peak point voltage and the valley voltage of the transistor Q12. For example, the potential or voltage at the terminal 251 may decrease suddenly from a voltage of approximately 10 volts which is positive with respect to the potential at the common conductor N1 to a valley voltage of approximately 3 volts which is positive with respect to the potential at the common conductor N1 when the transistor Q12 breaks over during the charging of the capacitor C9. It is to be noted that prior to the breakover of the transistor Q12, the voltage across the capacitor C9 will increase due to the charging current from the regulated potential at the conductor P1 to approximately the voltage at the terminal 251 which may for example be approximately 10 volts which is positive with respect to the common conductor N1 less the two forward voltage drops across the diode D27 and the base-emitter circuit of the transistor Q5 or the net voltage across the capacitor C9 may be approximately 9.4 volts prior to the breakover of the transistor Q12. When the transistor Q12 breaks over and the voltage at the terminal 251 suddenly decreases to the valley voltage of the transistor Q12, the voltage at the terminal 253 at the left side of the capacitor C9 wil change correspondingly in a negative direction substantially instantaneously since there is no low resistance discharge path provided for the capacitor C9. The voltage at the terminal 253 at the left side of the capacitor C9 will then change in a negative direction to a value which is equal for example to a voltage of 3 volts which is positive with respect to the common conductor N1 less 9.4 volts which is the approximate voltage across the capacitor C9 resulting in a voltage which is approximately equal to 6.4 volts which is instantaneously negative with respect to the common conductor N1. When the transistor Q12 breaks over and the voltage at the terminal 253 changes as just described, the diode D27 will then be reverse biased or blocked and the transistor Q5 will be actuated from a normally saturated condition to a substantially cut off or nonconducting condition since the base drive current will be effectively removed from the base-emitter circuit of the transistor Q5.

When the voltage at the left side of the capacitor C9 changes in a negative direction to a voltage value which is negative with respect to the voltage at the common conductor N1, the left side of the capacitor C9 will then be charged from the positive conductor P1 through the resistor R19 with the charging current flowing through the emitter and the lower base of the transistor Q12 to the common conductor N1. The voltage at the terminal 253 will gradually increase in a positive direction until the diode D27 is forward biased and the base drive current in the base-emitter circuit of the transistor Q5 is restored to actuate the transistor Q5 to substantially a saturated condition. It is to be noted that the transistor Q12 will be held in a substantially conducting condition in the circuit which includes the emitter in the lower base of the transistor Q12 by the charging current which flows from the positive conductor P1 to the left side of the capacitor C9 until the diode D27 becomes forward biased and the transistor Q5 is actuated to substantially a saturated condition.

When the transistor Q12 is no longer held in a substantially conducting condition in the circuit which includes the emitter and the lower base, the transistor Q12 will then be reset to substantially a nonconducting condition in the emitter-lower base circuit. The time interval or period required to charge the left side of the capacitor C9 at the terminal 253 following the breakover of the transistor Q12 is determined by the time constant of the resistor-capacitor circuit combination which includes the resistor R19 and the capacitor C9 which is charged from the voltage between the positive conductor P1 and the common conductor N1.

When the transistor Q5 of the control means 250 is rendered substantially nonconducting for substantially a predetermined time interval or period following the breakover of the transistor Q12, the associated transistor Q6 of the control means 250 is also actuated to a substantially nonconducting condition for substantially the same predetermined time interval due to the change in the voltage across the resistor R9 which effectively removes the base drive current from the transistor Q6 whenever the transistor Q5 is actuated to a substantially nonconducting condition, as previously explained. While the transistor Q6 is rendered substantially nonconducting for the predetermined time interval just indicated, a pulse of unidirectional output current $I_0$ at the collector of the transistor IC1–Q4 is diverted from the emitter-collector path of the transistor Q6 to a current path which includes the emitter-collector circuit of the transistor Q7 of the constant current circuit 230 and the diode D22 which is actuated to a forward biased condition whenever the transistor Q6 is actuated to a substantially nonconducting condition and is applied to charge the timing capacitor C7 when permitted to do so by the operation of the level detecting circuit 240 as previously explained. The pulses of current which are periodically available from the collector of the transistor IC1–Q4 and which are diverted from the emitter-collector circuit of the transistor Q6 to the current path which includes the diode D22 will have a magnitude or amplitude which is substantially proportional to the square of the highest line current flowing in the conductors L1, L2 and L3 as previously explained. Since the time required to charge the capacitor C9 and periodically break over the transistor Q12 is determined by the regulated potential at the conductor P1 and a resistance values of the rheostat RP1 and the resistor R22, the frequency or repetition rate of the output current pulses from the circuit means 260 and the circuit means 220B will be maintained at substantially a predetermined or substantially constant value which may be adjusted by the setting of the rheostat RP1 which effectively adjusts the duty cycle of the pulses of current applied from the circuit means 220B to be a predetermined percentage or fraction of the overall time period during which such pulses are applied to the timing capacitor C7. It is also to be noted that the periodic pulses of output current $I_0$ which are applied from the collector of the transistor IC1–Q4 to the current path which includes the diode D22 occur at the end of each sawtooth voltage waveform which is produced or generated by the circuit means 260 and that the duration or the width of such pulses is determined by the time required to charge the left side of the capacitor C9 from the regulated potential at the positive conductor P1 through the resistor R19 to sufficiently forward bias the diode D27 and to actuate the transistors Q5 and Q6 to substantially saturated conditions following the breakover of the transistor Q12. The duration or time width of the periodic pulses of output current from the circuit means 220B will therefore be maintained substantially constant or at a predetermined value since the time width of said pulses will be substantially independent of variations in the highest line current which flows in the conductors L1, L2 and L3 and the corresponding voltage across the resistor R1.

Recapitulating the operation of the overall long time delay tripping circuit 200 and more specifically the operation of the level detecting circuit 240, the circuit means 260 and the control means 250, whenever the highest line current flowing in the conductors L1, L2, and L3 exceeds the predetermined value as previously described, the transistor Q9 is actuated to a substantially nonconducting condition and the circuit means 260 assumes control of the operation of the control means 250 as just descibed to actuate the output current of the circuit means 220B to be applied to the timing capacitor C7 in the form of periodic output pulses as determined by the operation of the circuit means 260 as just described. Prior to the actuation of the transistor Q9 to a substantially nonconducting condition the upper side of the timing capacitor C7 is held or clamped at a potential which is approximately 1 volt which is positive with respect to the common conductor N1 and which is equal to the voltage drops across the diode D26, the emitter-collector circuit of the transistor Q9 and the base-emitter diode circuit of the transistor Q5. After the transistor Q9 is actuated to a substantially nonconducting condition, the upper side of the timing capacitor C7 is held or clamped at a regulated voltage which may for example be approximately 12.5 volts which is positive with respect to the voltage at the common conductor by the operation of the Zener diodes Z4 and Z5 which are associated with the constant current circuit 230. During the charging of the timing capacitor C7 by the periodic output pulses of current $I_0$ from the circuit means 220B as controlled by the operation of the circuit means 260 as just described, the voltage at the lower side of the timing capacitor C7 gradually changes to a more negative value which is closer to the potential at the common conductor N1 until the diode D23 which is normally reverse biased is forward biased due to the voltage change at the lower side of the capacitor C7 to thereby actuate the operation of the control means 270 as will be described hereinafter. Assuming that the highest line current flowing in the conductors L1, L2 and L3 continues to exceed the predetermined value to which the level detecting circuit 240 responds, the voltage across the capacitor C7 will increase in discrete steps until the voltage at the lower side of the capacitor C7 is sufficiently negative to forward bias the diode D23. The voltage at the lower side of the capacitor C7 which is necessary to actuate the operation of the control means 270 as will be described hereinafter is substantially equal to a predetermined or threshold voltage to which the control means 270 responds. When the circuit means 220B is permitted to continue to charge the timing capacitor C7 with periodic output pulses of current as controlled by the operation of the level detecting circuit 240 and the circuit means 260, the average charging current applied to the capacitor C7 at a voltage across the capacitor C7 will vary substantially with the square of the unidirectional voltage across the resistor R1 and, in turn, with substantially the square of the highest line current flowing in the conductors L1, L2 and L3. The time period or delay period required before the voltage across the capacitor C7 is sufficient to actuate the operation of the control means 270 will vary inversely with substantially the square of the highest line current flowing in the conductors L1, L2 and L3. The time delay period provided for a particular value of overload current in the line conductors L1, L2 and L3 may be adjusted by the setting of the rheostat RP1 which effectively adjusts the duty cycle of the periodic pulses of current applied to the timing capacitor C7 to be, for example, 2% of the total time to limit the required size of the capacitor C7 when actuated by the operation of the level detecting circuit 240, the circuit means 260 and the control means 250 as previously described.

In general, the circuit means 270 is connected in circuit relation with the timing capacitor C7 to respond to a predetermined voltage across the capacitor C7 to provide an output signal or current which is applied to the output circuit 600 to actuate the operation of the output circuit 600 to energize the trip coil 36 of the circuit breaker CB and to actuate the opening of said circuit breaker. More specifically, the control means 270 comprises the NPN transistors Q8 and Q14. The base of the transistor Q8 is connected to the positive conductor P3 through the resistor R14 to normally apply a base drive current to the base-emitter circuit of the transistor Q8 and is also connected to the lower side of the timing capacitor C7 through the diodes D23, D22 which are oppositely poled and which are both normally reverse biased. The emitter of the transistor Q8 is connected to the junction point between the Zener diodes Z4 and Z5, while the collector of the transistor Q8 is connected to the positive conductor P1 through the collector load resistor R15 and is also directly connected to coupled to the base of the transistor Q14. As previously mentioned, the base of the transistor Q14 is also connected to the collector of the transistor Q3 of the control means 150 through the diode D25 and the conductor 234 in order to prevent the operation of the long time delay tripping circuit 200 prior to the time that the capacitor C1 is fully charged or in the event that the capacitor C1 should not be fully charged during the operation of the protector device shown in FIG. 1. The collector of the transistor Q14, is directly connected to the positive conductor P1, while the emitter of the transistor Q14 is connected to the output circuit 600 through the diode D30 and the conductor PL1 as indicated in FIG. 2A. The capacitor C10 is connected between the base and the emitter of the transistor Q14 to prevent noise or voltage spikes from inadvertently actuating the transistor Q14 to a substantially saturated condition other than in response to the operation of the overall long time delay tripping circuit 200.

In the operation of the control means 270, prior to the time that the transistor Q9 is actuated to a substantially nonconducting condition by the operation of the level detecting circuit 240 and prior to the time that the charge on the capacitor C7 and the corresponding voltage thereacross is sufficient to forward bias the diode D23, the current flowing from the positive conductor P3 through the resistor R14 will be applied to the base-emitter circuit of the transistor Q8 to maintain the transistor Q8 in a substantially saturated operating condition. As long as the transistor Q8 remains in a normally saturated operating condition, the current which flows from the positive conductor P1 through the resistor R15 will be diverted through the collector-emitter circuit of the transistor Q8 away from the base-emitter circuit of the transistor Q14 and the transistor Q14 will be maintained in a normally nonconducting or cutoff condition to prevent the long time delay tripping circuit 200 from actuating the operation of the output circuit 600 as will be explained hereinafter. When the transistor Q9 is actuated to a substantially nonconducting condition to permit the timing capacitor C7 to start accumulating a charge from the pulses of current which are applied to the timing capacitor from the circuit means 220B as controlled by the operation of the circuit means 260 as previously described, the voltage across the capacitor C7 will gradually increase in discrete steps as previously described until the voltage across the capacitor C7 reaches a predetermined or threshold value and the voltage at the lower side of the timing capacitor C7 becomes sufficiently negative to forward bias the diode D23 as previously mentioned. The base drive current which is normally applied to the base-emitter circuit of the transistor Q8 will then be diverted to a current path which extends from a positive conductor P3 through the resistor R14 and the diode D23 to thereby actuate the transistor Q8 to a substantially nonconducting or cutoff condition. When the transistor Q8 is actuated to a substantially nonconducting condition, the current which flows from the positive conductor P1 through the resistor R15 will be diverted from the collector-emitter circuit of the transistor Q8 to the base-emitter circuit of the transistor Q14 to apply a base drive current to the transistor Q14 which will actuate the transistor Q14 from a normally substantially nonconducting condition to a saturated operating condition and a current will then flow from the positive conductor P1 through the collector-emitter circuit of the transistor Q14 and the diode D30 to the output circuit 600 to actuate the output circuit 600 to energize the trip coil 36 of the circuit breaker CB. As previously mentioned, the period of time or time delay required to cumulatively charge the timing capacitor C7 after the transistor Q9 has been actuated to a substantially nonconducting condition by the operation of the level detecting circuit 240 will vary inversely with substantially the square of the highest line current flowing in the conductors L1, L2 and L3 prior to the time that the control means 270 is actuated by the voltage across the timing capacitor C7 to produce the output signal or current just indicated which actuates the operation of the output circuit 600.

If the highest of the instantaneous time currents which flow in the line conductors L1, L2 and L3 should exceed the predetermined overload current to which the level detecting circuit 240 is adjusted to respond and then instantaneously decrease for a period of time less than the time delay which is provided in the operation of the level detecting circuit 240 as previously mentioned, the transistor Q9 will be maintained in a substantially nonconducting condition and prevented from being actuated to a saturated condition by the operation of the level detecting circuit 240 as previously explained. If however the time interval between successive periods of instantaneous overcurrent should exceed the time delay period which is provided in the operation of the level detecting circuit 240 as previously explained, the transistor Q9 will be permitted to be actuated to a saturated condition by the return of the transistor Q10 to a substantially nonconducting condition and the change in the voltage across the resistor R17 and rapidly reset the timing capacitor C7 by discharging the capacitor C7 through the circuit which includes the diode D26, the emitter-collector circuit of the transistor Q9 and the diode D24 which is connected between the lower side of the timing capacitor C1 and the common conductor N1 to thereby reset the timing capacitor C7 so that the time delay provided by the overall long time delay tripping circuit 200 would have to again start from an initial operating point on the timing capacitor C7 assuming that the capacitor C7 is reset before the charge and the voltage corresponding to the charge is sufficient to actuate the operation of the control means 270 as previously explained. The level detecting circuit 240 as described in greater detail in the patent previously mentioned therefore provides a relatively fast resetting time since the level detecting circuit 240 responds to the instantaneous value of the unidirectional voltage across the resistor R1 and, in turn, to the highest instantaneous line current flowing in the conductors L1, L2 and L3 and resets the timing capacitor C7 if the time interval between successive instantaneous periods of overcurrent above the predetermined value through which the level detecting circuit 240 is adjusted to respond is longer than the predetermined time period which may for example be slightly longer than one half cycle of the alternating current flowing in said conductors for which the level detecting circuit 240 is set by the values of the timing circuit which includes the capacitor C8 and the resistor R17. It is to be noted that the predetermined overcurrent level to which the level detecting circuit 240 responds is normally relatively lower than the instantaneous overload current to which the short delay tripping circuit 300 and the instantaneous tripping circuit 400 and 500 respond, as will be described hereinafter.

In the overall operation of the long time delay tripping circuit 200, when the capacitor C7 is permitted to charge from the output pulses of current from the circuit means 220B as controlled by the circuit means 260, the voltage across the capacitor C7 increases in discrete steps until the voltage at the lower side of the capacitor C7 is sufficiently negative to forward bias the diode D23. When the diode D23 is forward biased by the voltage at the lower side of the capacitor C7 increasing in a negative direction to substantially a predetermined or threshold value, the control means 270 is actuated to produce an output signal or current which is applied through the diode D30 to the output circuit 600, as will be explained hereinafter, to actuate the operation of the output circuit 600 to thereby energize the trip coil 36 of the circuit breaker CB and to actuate the opening of said circuit breaker. Since the average charging current applied to the timing capacitor C7 from the circuit means 220B when the circuit means 220B is permitted to charge the capacitor C7 by the level detecting circuit 240 and the circuit means 260 is substantially proportional to the square of the unidirectional voltage across the resistor R1 and, in turn, to the highest line current flowing in the conductors L1, L2 and L3, the time delay period required to charge the capacitor C7 to substantially a predetermined or threshold value sufficient to actuate the control means 270 and, in turn, the output circuit 600 varies inversely with substantially the square of the highest line current which flows in the line conductors L1, L2 and L3.

OUTPUT CIRCUIT 600

In general, the output circuit 600 of the protective device shown in FIG. 1, is connected to the long time delay tripping circuit 200 to respond to substantially a predetermined charge on the capacitor C7 which corresponds to a predetermined or threshold voltage across said capacitor to actuate the energization of the trip coil 36 of the circuit breaker CB following a predetermined time delay which is initiated when the level detecting circuit 240 permits the timing capacitor C7 to start accumulating the necessary charge and which varies inversely with substantially the square of the highest line current flowing in the conductors L1, L2 and L3. More specifically as shown in FIG. 2B, the output circuit 600 comprises the current amplifying transistors Q20 and Q23, the output level detecting circuit or trigger circuit 610 and the semiconductor switching device Q26 whose operation is actuated by the output level detecting circuit 610.

The current amplifying transistor Q20 which is of the NPN type is connected to the timing capacitor C7 of the long time delay tripping circuit 200 through the control means 270 to respond to a predetermined or threshold voltage at the lower side of said timing capacitor which actuates the control means 270 to produce an output signal which, in turn, actuates the transistor Q20 from a normally substantially nonconducting condition to a substantially saturated condition. More specifically, the base of the transistor Q20 is connected to the output of the control means 270 at the emitter of the transistor Q14 through a series circuit which includes the diode D30 and the normally blocked or reverse biased diode D45. The diode D30 is connected to the diode D45 through the terminal 326 and the conductor TL1 which is indicated in FIGS. 2A and 2B. The emitter of the transistor Q20 is connected to the common conductor N1 through the resistors R46 and R47 which are connected in series with one another. In order to bias or maintain the transistor Q20 in a normally substantially nonconducting or cutoff condition, the junction point between the emitter of the transistor Q20 and the resistor R46 is connected to the positive conductor P3 through the forward connected diode D39. If the regulated potential at the conductor P3 is 16 volts, for example, the voltage at the emitter of the transistor Q20 will be 16 volts less the forward voltage drop across the diode D39 or approximately 15.5 volts. The capacitor C18 is electrically connected in parallel with the series circuit which includes the resistors R46 and R47 to maintain the desired potential at the emitter of the transistor Q20 in cooperation with the diode D39 in the event that the regulated potentials at the conductors P1, P2 and P3 should collapse or be interrupted during the operation of the protective device shown in FIG. 1, while the timing capacitor C7 is partially charged which might otherwise cause an improper operation of the output circuit 600 and energize the trip coil 36 of the circuit breaker CB prematurely in an undesirable manner. The capacitor C17 is connected between the base and the emitter of the transistor Q20 to prevent noise or voltage spikes from inadvertently actuating the transistor Q20 to a substantially saturated condition other than in response to the operation of the long time delay tripping circuit 200 or short delay tripping circuit 300 or the instantaneous tripping circuits 400 and 500. The resistor R48 is connected between the base of the transistor Q20 and the junction point between the resistors R46 and R47 to assist in preventing the transistor Q20 from being actuated to a substantially saturated condition by the leakage current which might otherwise flow in the base-emitter circuit in the transistor Q20.

In the operation of the current amplifying transistor Q20, when the voltage at the lower side of the timing capacitor C7 increases to a predetermined or threshold value and the control means 270 responds to produce an output signal or current at the conductor TL1, a base drive current flows from the positive conductor P1 through the collector-emitter circuit of the transistor Q14, the diode D30 and the diode D45 and through the base-emitter circuit of the transistor Q20 to actuate the transistor Q20 from a substantially nonconducting condition to a substantially saturated operating condition. When the transistor Q20 is actuated to a substantially saturated condition, saturation current will flow from the postive conductor P1 through the collector load resistor R45 which is connected between the positive conductor P1 and the collector of the transistor Q20, through the collector-emitter circuit of the transistor Q20 and to the common conductor N1 through the resistors R46 and R47.

In general, the second current amplifying transistor Q23 of the output circuit 600 is connected in circuit relation with the first current amplifying transistor Q20 to respond to the operation of the transistor Q20 to change from a substantially nonconducting or cut-off condition to a substantially saturated condition whenever the transistor Q20 is actuated to a saturated condition in response to the operation of the control means 270 and to the voltage at the lower side of the timing capacitor C7, as just described. More specifically, the base of the transistor Q23 which is of the PNP type is connected to the junction point between the collector of the transistor Q20 and the collector load resistor R45. The emitter of the transistor Q23 is connected to the positive conductor P1 through a forward connected diode D43 which is provided to establish the minimum base drive current necessary to actuate the transistor Q23 to a substantially saturated condition. The capacitor C19 may be connected between the positive conductor P1 and the base of the transistor Q23 to prevent the inadvertent operation of the transistor Q23 due to noise or voltage spikes which may occur on the positive conductor P1. The collector of the transistor Q23 is connected to the common conductor N1 through a voltage dividing network which includes the collector load resistors R52 and R53. It is to be noted that the junction point between the resistors R52 and R53 is connected to the control means 150 previously described through the diode D34 and the conductor 234 through the terminal 330.

In the operation of the current amplifying transistor Q23, as long as the current amplifying transistor Q20 is in a normally nonconducting condition, the current which flows in the collector-emitter circuit of the transistor Q20 through the resistor R45 is substantially negligible and the base of the transistor Q23 is maintained at a potential which is very close to the potential at the positive conductor P1 to thereby maintain the transistor Q23 in a substantially nonconducting condition. As long as the transistor Q23 remains in a substantially nonconducting condition, the current flow in the emitter-collector circuit of the transistor Q23 is substantially negligible and the voltage drop across the resistor R53 will be relatively low thereby resulting in a voltage at the upper end of the resistor R53 which is relatively close to the voltage at the common conductor N1.

When the transistor Q20 is actuated to a substantially saturated condition in response to the voltage at the lower side of the timing capacitor C7 increasing to the predetermined or threshold value previously mentioned, the control means 270 responds to actuate the transistor Q20 to a substantially saturated condition and the current in the collector-emitter circuit of the transistor Q20 increases to the saturation current. The current which flows through the collector load resistor R45 and the increased voltage drop across the resistor R45 result in a base drive current being applied to the emitter-base circuit of the transistor Q23 which flows from the conductor P1 through the forward connected diode D43 and the emitter-base circuit of the transistor Q23 to actuate the transistor Q23 to a substantially saturated condition. When the transistor Q23 is actuated to substantially a saturated condition, the current flowing in the emitter-collector circuit of the transistor Q23 is limited only by the values of the resistors R52 and R53 and the voltage between the conductors P1 and N1. The increased current which flows in the emitter-collector circuit of the transistor Q23 results in an increased voltage drop across the resistor R53 and the voltage at the junction point between the resistors R52 and R53 increases to a level which may, for example, be approximately 8 volts which is positive with respect to the common conductor N1 after the capacitor C22 which is connected in parallel with the resistor R53 charges up to such a voltage.

In general, the output level detecting circuit 610 or the trigger circuit 610 is connected to the current amplifying transistor Q23 to respond to the predetermined or threshold voltage across the timing capacitor C7 as reflected by the operating condition of the transistor Q23. The output level detecting circuit 610 is of the breakover type in that once the operation of the output level detecting circuit 610 is initiated, the operation of said circuit continues or proceeds by regenerative action until the operation of said circuit is completed. The output level detecting circuit 610 comprises the PNP transistor Q24 and the NPN transistor Q25. In general, the transistors Q24 and Q25 are connected in a circuit which is equivalent to that of a silicon controlled rectifier except that the transistor Q24 is connected in an inverted arrangement with the emitter and the collector interchanged compared with the usual equivalent circuit. More specifically, the collector of the transistor Q24 is connected to the junction point between the resistors R52 and R53, while the base of the transistor Q24 is connected to the collector of the transistor Q25. The emitter of the transistor Q24 is directly connected to the base of the transistor Q25, while the base of the transistor Q25 is connected to the common conductor N1 through the resistor R56 which prevents small amounts of leakage current from actuating the transistor Q25 to a saturated condition. The emitter of the transistor Q25 is connected to the gate electrode of the silicon controlled rectifier or semiconductor switching device Q26. In order to provide a certain degree of noise suppression in the operation of the output level detecting circuit 610, the emitter of the transistor Q25 is connected to the common conductor N1 through a parallel circuit which includes the resistor R57 and the capacitor C23.

In order to energize the trip coil 36 of the circuit breaker CB in response to the operation of the output level detecting circuit 610, the anode of the silicon controlled rectifier Q26 is connected to the positive conductor P1 through the resistor R55, while the cathode of the silicon controlled rectifier is connected to the common conductor N1. The trip coil 36 is electrically connected in parallel with the resistor R55 at the terminals 612 and 614 by the conductor 615 between the positive conductor P1 which, in turn, is connected to one side of the supply capacitor C1 of the power supply input circuit 100 and a junction point between the resistor R55 and the anode of the silicon controlled rectifier Q26. More specifically, the trip coil 36 is connected between the terminal 612, as shown in FIGS. 1 and 2B, which, in turn, is connected to the positive conductor P1 and the terminal 614 which is connected, in turn, to the junction point between the resistor R55 and the anode of the silicon controlled rectifier Q26. In order to prevent an improper operation of the silicon controlled rectifier Q26 due to transient voltage surges which may occur during the overall operation of the protective device shown in FIG. 1, a noise suppression network which includes the resistor R58 and the capacitor C24 is connected in series is connected between the anode and the cathode of the controlled rectifier Q26 to bypass transient voltage surges around the controlled rectifier Q26. In addition, the capacitor C25 may be connected between the anode of the controlled rectifier Q26 and the common conductor N1 to provide an additional degree of noise suppression in the operation of the silicon controlled rectifier Q26.

In the overall operation of the output circuit 600, when the voltage across the timing capacitor C7 of the long time delay tripping circuit 200 reaches the predetermined or threshold value previously mentioned, the control means 270 is actuated to apply a base drive current to the transistor Q20 of the output circuit 600 to actuate the transistor Q20 from a subsantially nonconducting condition to substantially a saturated condition. The increased current flow through the collector-emitter circuit of the transistor Q20 then results in an increased voltage drop across the resistor R45 which results in a base drive current which is applied to the emitter-base circuit of the transistor Q23 to also actuate the transistor Q23 from a substantially nonconducting condition to substantially a saturated condition to thereby increase the current in the emitter-collector circuit of the transistor Q23. The increased current in the emitter-collector circuit of the transistor Q23 results in an increased voltage drop across the resistor R53 as the capacitor C22 charges up during the operation of the current amplifying transistor Q23. Prior to the increased voltage drop across the resistor R53, the voltage at the collector of the transistor Q24 is insufficient to actuate the transistors Q24 and Q25 to substantially saturated conditions and the transistors Q24 and Q25 remain in substantially nonconducting conditions. When the voltage at the collector of the transistor Q24 increases to a predetermined value with respect to the potential at the common conductor N1, the transistor Q24 first responds by an avalanche breakdown of the base-emitter junction of the transistor Q24. A base drive current then flows from the collector of the transistor Q24 into the base-emitter circuit of the transistor Q25 thus causing the collector-emitter circuit of the transistor Q25 to conduct slightly. The collector current of the transistor Q25 which is the base current of the transistor Q24 actuates the collector-emitter circuit of the transistor Q24 to conduct partially. When the transistor Q24 conducts partially, the base drive current of the transistor Q25 is increased to thereby cause a regenerative turn on action of the transistors Q24 and Q25. When the transistors Q24 and Q25 are actuated to saturated conditions as just described, the voltage or charge across the capacitor C22 discharges through the transistors Q24 and Q25 into the gate electrode of the controlled rectifier Q26 and flows to the anode of the controlled rectifier Q26 to thereby actuate the controlled rectifier Q26 to a substantially conducting condition. When the controlled rectifier Q26 is actuated to a substantially conducting condition, the trip coil 36 is energized by the current which flows from the positive conductor P1 through the trip coil 36 and the anode-cathode circuit of the controlled rectifier Q26 to the common conductor N1 to thereby actuate a tripping operation of the circuit breaker CB. It should be noted that the current which energizes the trip coil 36 flows from the right side of the energy storing capacitor C1, as shown in FIG. 2A, through the positive conductor P1, the terminal 612, the trip coil 36, the terminal 614, the anode-cathode circuit of the controlled rectifier Q26, as shown in FIG. 2B, to the common conductor N1 and then to the left side of the capacitor C1, as shown in FIG. 2A.

In the event that the capacitor C1 is not sufficiently charged to energize the trip coil 36, the control means 150, as previously described, will prevent the operation of the output circuit 600 by providing a relatively low resistance path from the upper end of the resistor R53 at the collector of the transistor Q24 through the diode D34 and the conductor 234 and through the collector-emitter circuit of the transistor Q3 which forms part of the control means 150 to the common conductor N1 which will prevent the regenerative operation of the output level detecting circuit 610 of the output circuit 600.

It is to be noted that after the trip coil 36 is energized by the discharge of the capacitor C1 through said trip coil and the controlled rectifier Q26, the resistor R55 which is connected in series with the anode-cathode circuit of the controlled rectifier Q26 provides a circulating path to dissipate stored energy in the trip coil 36 which normally results in an inductive device, such as the trip coil 36, and thereby limits the inverse voltage applied to the controlled rectifier Q26 to a value within the rating of the controlled rectifier Q26.

In summary, the overall operation of the protective device shown in FIG. 1 due to the long time delay tripping circuit 200 is such that the tripping time in seconds of the associated circuit breaker CB varies substantially inversely with the square of the highest overcurrent in the line conductors L1, L2 and L3 over a predetermined range of overcurrents to which the long time delay tripping circuit 200 responds. The predetermined highest line current which actuates the start of the time delay provided in the operation of the long time delay tripping circuit 200 may be controlled between predetermined limits by the setting of the rheostat RP1 which forms part of the control means 260 of the long time delay tripping circuit 200. The minimum and maximum time delay characteristics or curves provided by the time delay tripping circuit 200 may be obtained by the adjustment of the rheostat RP1 which forms part of the circuit means 260 previously described with a family of intermediate time delay characteristics or curves being available by the adjustment of the rheostat RP1 between the limiting positions. From another perspective, the long time delay tripping circuit 200 provides substantially an $I^2t$ equals to K (where K equals the constant and $t$ equals tripping time) operating characteristic which may be varied in a substantially continuous manner between the minimum time delay characteristics and the maximum time delay characteristics by the adjustment of the rheostat RP1 which in effect varies the constant K to which $I^2t$ is substantially equal over a predetermined operating range of overload currents. As previously explained, if the highest line current flowing in the conductors L1, L2 and L3 exceeds the predetermined or threshold value to which the level detecting circuit 240 responds, as determined by the setting of the rheostat RP2, the timing capacitor C7 will be permitting to start accumulating a charge from the circuit means 220B as controlled by the circuit means 260. If, however, the highest line current flowing in the conductors L1, L2 and L3 then instantaneously decreases to a value less than the predetermined value to which the level detecting circuit 240 responds and remains less than the predetermined value, the timing capacitor C7 will be reset by the level detecting circuit 240 after a predetermined time interval which depends upon the operation of the timing circuit which forms part of the level detecting circuit 240 and which may be adjusted or selected to be slightly longer than one half cycle of the alternating current flowing in conductors L1, L2 and L3 assuming that the last mentioned time interval before the resetting of the capacitor C7 ends before the voltage across the capacitor C7 is sufficient to actuate the operation of the control means 270 and, in turn, the operation of the output level detecting circuit 610 of the output circuit 600. The resetting of the timing capacitor C7 will be accomplished by restoring the control means 280 which comprises the transistor Q9 to an operating condition which permits the transistor Q9 to be actuated to substantially a saturated condition which rapidly discharges the timing capacitor C7 at the end of the time interval just mentioned.

SHORT DELAY TRIPPING CIRCUIT 300

Referring now to the short delay tripping circuit 300 which is indicated in block form in FIG. 1 and shown in detail in FIG. 2A, the short delay tripping circuit 300 is connected between the auctioneering circuit 110 and the output circuit 600 to respond to the highest instantaneous line current flowing in the conductors L1, L2 and L3 when the highest instantaneous line current exceeds substantially a predetermined or threshold value to actuate the output circuit 600 to energize the trip coil 36 following a substantially fixed or preterminal time delay which remains at the same predetermined duration and is independent of the magnitude of the highest instantaneous current in excess of the predetermined value to which the short delay tripping circuit 300 responds to start the time delay. It is to be noted that the short delay tripping circuit 300 may be employed where required in combination with the long time delay tripping circuit 200 and with either both the instantaneous tripping circuit 400 and the instantaneous circuit 500 or only the instantaneous tripping circuit 500 and that the short delay tripping circuit 300 independently actuates the output circuit 600 to energize the trip coil 36 with the predetermined current to which the short delay tripping circuit 300 responds being coordinated with the range of overload currents to which the long time delay tripping circuit 200 responds and the predetermined instantaneous currents to which either the instantaneous tripping circuit 400 or the instantaneous tripping circuit 500 where provided responds.

More specifically, the short delay tripping circuit 300 comprises a level detecting circuit 310 which includes the PNP transistors Q13 and Q15 and a voltage dividing network which controls the conducting state of a control means which comprises the diode D31 and which has a time delay reset operation of the same general type as previously described in detail in connection with the level detecting circuit 240 of the long time delay tripping circuit 200. The voltage dividing network of the short delay tripping circuit 300 includes the rheostat RP3 and the resistors R26 and R24 which are connected in series with one another between the variable voltage output conductor V1 of the auctioneering circuit 110 and the positive conductor P3. The base of the transistor Q13 is connected to the junction point between the resistors R26 and R24, while the emitter of the transistor Q13 is connected to the positive conductor P1. The diode D29 is connected between the base and the emitter of the transistor Q13 to protect the emitter-base circuit of the transistor Q13 from excessive reverse bias by limiting the maximum reverse voltage applied to the emitter-base circuit of the transistor Q13 to the forward voltage drop of the diode D29. The input voltage of the short delay tripping circuit 300 which is the sum of the voltage drops across the rheostat RP3 and the resistor R26 is substantially equal to the unidirectional voltage across the resistor R1 and, in turn, is directly proportional to the highest instantaneous line current flowing in the conductors L1, L2 and L3. The forward voltage drop in the emitter-base circuit of the transistor Q13 compensates the input voltage of the short delay tripping circuit 300 for the forward voltage drop across the diode D19 of the auctioneering circuit 110. The collector of the transistor Q13 is directly connected to the base of the transistor Q15 and also to the common conductor N1 through the collector load resistor R29. The emitter of the transistor Q15 is directly connected to the positive conductor P1 while the collector of the transistor Q15 is connected to the common conductor N1 through the collector load resistor R28 and to the upper side of the timing capacitor C12 of the short delay tripping circuit 300 through the diode D32. In order to delay the reset of the short delay tripping circuit 300 following the end of a period of time during which the highest instantaneous current flowing in the conductors L1, L2 and L3 exceeds the predetermined or threshold value to which the short delay tripping circuit 300 is adjusted to respond by the setting of the rheostat RP3, the capacitor C11 is connected between the emitter and the collector of the transistor Q15 or is connected between the positive conductor P1 and the upper end of the resistor R28.

In order to provide a substantially fixed or predetermined time delay between the start of an instantaneous overcurrent, which exceeds the predetermined value to which the short delay tripping circuit is adjusted to respond, and the time when the voltage across the capacitor C12 causes the transistor Q20 of the output circuit 600 to be actuated to a substantially saturated condition, a resistor-capacitor timing circuit is provided as part of the short delay tripping circuit 300. This timing circuit includes the rheostat RP4, the resistor R30 and the timing capacitor C12 with the rheostat RP4 and the resistor R30 being connected in series with one another between the positive conductor P1 through the conductor 613 and the terminal 612 and the upper side of the timing capacitor C12. The upper side of the timing capacitor C12 is also connected to the base of the transistor Q20 which forms part of the output circuit 600 through the normally reverse biased diode D31, the conductor TL1 and the diode D45. The lower side of the timing capacitor C12 is connected to the common conductor N1. In the operation of the short delay tripping circuit 300, it is important to note that the output voltage of the auctioneering circuit 110 and the variable voltage conductor V1 which forms the input signal or voltage for the short delay tripping circuit 300 is unfiltered and therefore the input voltage of the short delay tripping circuit 300 which appears across the rheostat RP3 and the resistor R26 varies substantially instantaneously with the highest line current flowing in the conductors L1, L2 and L3.

As long as the highest instantaneous line current flowing in the conductors L1, L2 and L3 remains below or less than substantially a predetermined value and the corresponding instantaneous unidirectional voltage across the resistor R1 remains below a corresponding predetermined value, the transistor Q13 will be in a normally saturated condition since the emitter-base circuit of the transistor Q13 will be forward biased with the voltage at the conductor P1 being greater than the voltage at the base of the transistor Q13. The predetermined highest instantaneous current to which the short delay tripping circuit 300 is adjusted to respond is determined by the setting of the rheostat RP3. As long as the transistor Q13 is in a normally saturated condition, the emitter-base circuit of the transistor Q15 will be biased at substantially zero voltage and the transistor Q15 will be maintained in a substantially non-conducting condition. As long as the transistor Q15 is in a substantially nonconducting condition, the voltage drop across the resistor R28 due to the emitter-collector current of the transistor Q15 will be relatively low and the voltage at the cathode of the diode D32 will be relatively close to that of the common conductor N1 with the diode D32 being forward biased to prevent the timing capacitor C12 from accumulating a charge from the positive conductor P1 through the rheostat RP4 and the resistor R30. Since the cathode of the diode D32 is normally maintained at a positive voltage with respect to the common conductor N1, the diode D31 will normally be reverse biased since the voltage at the anode of the diode D31 will be equal to the sum of the forward voltage drop across the diode D32 and the relatively small voltage drop across the resistor R28 as long as the highest instantaneous line current flowing in the conductors L1, L2 and L3 remains below the predetermined value to which the short delay tripping circuit is adjusted to respond by the setting of the rheostat RP3. It is to be noted that as long as the transistor Q15 is in a normally nonconducting condition, the capacitor C11 which is connected between the emitter and the collector of the transistor Q15 will be charged up to a voltage which is equal to the difference in voltage between the conductors P1 and N1 less a relatively low voltage drop across the resistor R28.

When the highest instantaneous current flowing in the conductors L1, L2 and L3 exceeds substantially a predetermined or threshold value to which the short delay tripping circuit 300 is adjusted to respond, the current which flows in the voltage dividing network which includes the rheostat RP3 and the resistors R26 and R24 will increase until the voltage at the base of the transistor Q13 increases in a positive direction to reverse bias the emitter-base circuit of the transistor Q13 which will then be actuated to a substantially nonconducting condition. When the transistor Q13 is actuated to a nonconducting condition, the current in the emitter-collector path of the transistor Q13 will decrease to a negligible value and the current which flows in the resistor R29 will now flow from the positive conductor P1 through the emitter-base circuit of the transistor Q15 which will be actuated to a substantially saturated condition. When the transistor Q15 is actuated to a substantially saturated condition, the current in the emitter-collector path of the transistor Q15 increases to thereby cause an increased voltage drop across the resistor R28 which will then result in a voltage at the cathode of the diode D32 which is sufficient to reverse bias the diode D32 to permit the timing capacitor C12 to start accumulating charge from the positive conductor through the rheostat RP4 and the resistor R30. Assuming that the overcurrent condition to which the short delay tripping circuit 300 is adjusted to respond continues for the predetermined or fixed time delay which is determined by the setting of the rheostat RP4, the resistor R30 and the capacitor C12 along with the value of the regulated potential at the conductor P1, the voltage at the upper side of the timing capacitor C12 will be sufficient to forward bias the diode D31. When the diode D31 is forward biased, current will flow from the conductor P1 through the rheostat RP4 and the resistor R30 to cause a base drive current to flow through the diode D31, the conductor TL1 and the diode D45 into the base-emitter circuit of the transistor Q20 of the output circuit 600 to thereby cause the transistors Q20 and Q23 and the level detecting circuit 610 to actuate the controlled rectifier Q26 of the output circuit 600 to a substantially conducting condition to thereby energize the trip coil 36 of the circuit breaker CB and to actuate the circuit breaker CB to an open condition.

It is to be noted that when the transistor Q15 is actuated to a substantially saturated condition in response to the highest instantaneous current which flows in the conductors L1, L2 and L3, the capacitor C11 will rapidly discharge through the emitter-collector path of the transistor Q15. If the highest instantaneous current flowing in the conductors L1, L2 and L3 exceeds the predetermined value to which the short delay tripping circuit 300 is adjusted to respond by the setting of the rheostat RP3 and then instantaneously decreases below the predetermined value, the transistor Q13 will be returned substantially instantaneously to a saturated condition and the transistor Q15 will be restored substantially instantaneously to a substantially nonconducting condition. The capacitor C11 will then start to charge from the voltage between the conductors P1 and N1 through the resistor R28. While the capacitor C11 is charging, the voltage across the resistor R28 will gradually decrease until the voltage at the cathode of the diode D32 decreases sufficiently to forward bias said diode thereby rapidly discharging the timing capacitor C12 if the overall time delay provided by the short delay tripping circuit 300 has not been completed. In other words, after the operation of the short delay tripping circuit 300 has been actuated by the highest instantaneous current flowing in the conductors L1, L2 and L3 and then the highest instantaneous current decreases below the predetermined value necessary to actuate the short delay tripping circuit 300 for a predetermined time period which is determined by the values of the capacitor C11 the resistor R28 and the value of the voltage between the conductors P1 and N1, the resetting of the short time delay tripping circuit 300 be delayed for a predetermined time interval which may be slightly longer than one half cycle of the alternating current flowing in the conductors L1, L2 and L3 similarly to the level detecting circuit 240 of the long time delay tripping circuit 200 as previously described. On the other hand, if the highest instantaneous current flowing in the line conductors L1, L2 and L3 exceeds the substantially predetermined value to which the short delay tripping circuit 300 is adjusted to respond and then decreases for a period of time less than the time delay provided in the resetting of the short delay tripping circuit 300, the timing out or accumulation of charge on the timing capacitor C12 will continue in an uninterrupted fashion. It is to be noted that the substantially predetermined time delay provided in the overall operation of the short delay tripping circuit 300 is independent of the magnitude of the highest instantaneous line current in the conductors L1, L2 and L3 for values of current in excess of the predetermined value to which the short delay tripping circuit 300 is adjusted to respond by the setting of the rheostat RP3 and that the predetermined time delay provided may be adjusted by the setting of the rheostat RP4.

It is to be noted that the short delay tripping circuit 300 determines by the predetermined instantaneous current to which it is adjusted to respond the upper end of the range of overcurrents to which the long time delay tripping circuit 200 will respond in a particular application since if the highest instantaneous line current flowing in the conductors L1, L2 and L3 exceeds the predetermined value to which the short delay tripping circuit 300 is adjusted to respond, the output circuit 600 will be actuated to energize the trip coil 36 after substantially a predetermined time delay which is normally shorter than the predetermined time delay provided in the operation of the long time delay tripping circuit 200. It is also to be noted that the reset of the short delay tripping circuit 300 is accomplished by the discharge of the capacitor C12 through the diode D32 and the resistor R28 to the common conductor N1 rather than employing a control means such as the control means 280 which forms part of the level detecting circuit 240 of the long time delay tripping circuit 200 as previously described.

In summary, it is important to note that the short delay tripping circuit 300 may be adjusted to respond to the same or to a higher instantaneous current as that to which the instantaneous tripping circuit 400 responds in a particular application because of the difference in time-current characteristics of the two tripping circuits. It is important to note that the upper end of the rheostat RP4 of the short delay tripping circuit 300 is connected to the regulated potential at the conductor P1 through the conductor 613 and the terminal 612 in order to insure that the duration of the substantially fixed time delay provided by the short delay tripping circuit 300 remains at substantially the predetermined value or duration as determined by the setting of the rheostat RP4.

FIRST INSTANTANEOUS TRIPPING CIRCUIT 400

Referring now to the first instantaneous tripping circuit 400 indicated in block form in FIG. 1 and shown in detail in FIG. 2B, the first instantaneous tripping circuit 400, in general, is connected between the auctioneering circuit 110 of the power supply input circuit 100 and the output circuit 600 to actuate energization of the trip coil 36 of the circuit breaker CB when the highest instantaneous line current flowing in the conductors L1, L2 and L3 increases above or exceeds substantially a predetermined or threshold value without any intentional or deliberate time delay.

More specifically, the instantaneous tripping circuit 400, as shown in FIG. 2B, comprises a PNP transistor Q16 and a voltage dividing network which includes the rheostat RP5, the resistor R31 and the resistor R33 which are connected electrically in series with one another between the variable voltage output conductor V1 of the auctioneering circuit 110 and the positive conductor P3. The emitter of the transistor Q16 is connected to the junction point between the resistors R31 and R33, while the base of the transistor Q16 is connected to the positive conductor P2 in order that the forward voltage drop across the diodes D17 and D18 of the power supply input circuit 100 compensate the input voltage of the instantaneous tripping circuit 400 for the forward voltage drop across the diode D19 and for the forward voltage drop across the emitter-base circuit of the transistor Q16 during the operation of the of the instantaneous tripping circuit 400. The diode D33 is connected between the emitter and the base of the transistor Q16 in order to protect the emitter-base circuit of the transistor Q16 from excessive reverse bias by limiting the maximum reverse voltage applied to the emitter-base circuit of the transistor Q16 to the forward voltage drop of the diode D33. The collector of the transistor Q16 is connected to the common conductor N1 by the collector load resistor R32. The output of the instantaneous tripping circuit 400 at the collector of the transistor Q16 is connected to the base of the transistor Q20 of the output circuit 600 by the isolating diode D35 whose anode is connected to the collector of the transistor Q16 and whose cathode is connected to the base of the transistor Q20 through the conductor TL1 and the diode D45. The capacitor C14 is connected electrically in parallel with the resistor R32 between the collector of the transistor Q16 and the common conductor N1 in order to provide a predetermined degree of noise suppression in the operation of the instantaneous tripping circuit 400 by diverting the output of the instantaneous tripping circuit 400 to the common conductor N1 when the output is due to transient voltage surges which may occur during the operation of the overall protective device shown in FIG. 1 and also to provide a pulse of discharge current to the output circuit 600 during the operation of the instantaneous tripping circuit 400 to insure that the transistors Q20 and Q23 are both actuated to substantially saturated operating conditions and to insure that the controlled rectifier Q26 is actuated to a substantially conducting condition to energize the trip coil 36 during the overall operation of the protective device shown in FIG. 1.

In the operation of the instantaneous tripping circuit 400, the base of the transistor Q16 is held at the regulated potential at the positive conductor P2. The voltage at the emitter of the transistor Q16 is substantially proportional to the unidirectional voltage across the resistor R1 and, in turn, to the highest instantaneous line current flowing in the conductors L1, L2 and L3. More specifically, the voltage at the emitter of the transistor Q16 is equal to the voltage at the positive conductor P3 plus the voltage drop across the resistor R33 which depends in part on the setting of the rheostat RP5. As long as the highest instantaneous line current flowing in the conductors L1, L2 and L3 remains below substantially a predetermined or threshold value, the emitter-base circuit of the transistor Q16 is reverse biased and the transistor Q16 is maintained in a substantially nonconducting condition. As long as the transistor Q16 is substantially nonconducting, the current flow to the resistor R32 from the emitter-selector circuit of the transistor Q16 is substantially negligible and the potential at the anode of the diode D35 is relatively close to the potential at the common conductor N1 with the diode D35 being normally reverse biased due to potential which is applied to the cathode of the diode D35. When the highest instantaneous line current flowing in one of the conductors L1, L2, and L3 exceeds substantially a predetermined value to which the instantaneous tripping circuit 400 is adjusted to respond by the setting of the rheostat RP5 and the correspondnig unidirectional voltage across the resistor R1 exceeds substantially a predetermined value, the voltage at the emitter of the transistor Q16 increases in a positive direction sufficiently to forward bias the emitter-base circuit of the transistor Q16 and to actuate the transistor Q16 to substantially a saturated condition. Due to the increased current flow in the emitter-collector circuit of the transistor Q16, the voltage drop across the resistor R32 increases to thereby forward bias the diode D35 and the output current of the instantaneous tripping circuit 400 flows from the collector of the transistor Q16 through the diode B35 the conductor TL1 and the diode D45 into the base-emitter circuit of the transistor Q20 to actuate the output circuit 600 to, in turn, actuate the controlled rectifier Q26 to a substantially conducting condition and to energize the trip coil 36 as previously explained in connection with the operation of the long time delay tripping circuit 200. As previously mentioned, when the highest instantaneous line current flowing in the conductors L1, L2 and L3 exceeds substantially a predetermined value for which the rheostat RP5 is adjusted, the instantaneous tripping circuit 400 actuates the energization of the trip coil 36 in a substantially instantaneous manner without any intentional time delay.

It is to be noted that setting of the instantaneous tripping circuit 400 determines the upper limit or end of the range of overload currents to which the long time delay tripping circuit 200 responds since when the highest instantaneous line current flowing in the conductors L1, L2 and L3 exceeds the predetermined value to which the instantaneous tripping circuit 400 responds, the trip coil 36 of the circuit breaker CB will be energized substantially instantaneously as determined by the operating characteristics of the instantaneous tripping circuit 400 without any intentional time delay being introduced prior to the energization of the trip coil 36. It is also important to note that the energization of the trip coil 36 in response to the long time delay tripping circuit 200 or the instantaneous tripping circuit 400 occurs independently either after a predetermined time delay which varies substantially inversely with the square of the overcurrent in the case of the long time delay tripping circuit 200 or substantially instantaneously in response to the operation of the instantaneous tripping circuit 400. Where the short time delay circuit 300 is also provided, the output circuit 600 is also actuated independently by the short delay tripping circuit 300 after substantially predetermined time delay when the overcurrent exceeds the predetermined instantaneous current for which the short delay tripping circuit 300 is adjusted to respond. It is to be further noted that in certain applications where the maximum time delay required in a relatively long time delay tripping circuit is relatively smaller, such as 10 seconds or less, the size of the capacitor C7 required may be such that the circuit means 260 is not required to limit the size or capacity of the capacitor C7 and the circuit means 260 may be omitted. In such a modified embodiment of the invention, the output current $I_0$ of the circuit means 220B might be applied directly to the capacitor C7 when permitted to do so by the operation of the level detecting circuit 240. In such an embodiment, the charging current applied to the capacitor C7 will not be in the form of pulses as previously disclosed but will be substantially continuous assuming that the circuit means 260 were omitted.

SECOND INSTANTANEOUS TRIPPING CIRCUIT 500

In general, the second instantaneous tripping circuit 500 which is indicated in block form in FIG. 1 and shown in detail in FIG. 2B, is typically provided in applications where only a long time delay tripping circuit and a short delay tripping circuit are needed or desired and an instantaneous tripping circuit of the type illustrated in the first instantaneous tripping circuit 400 is not desired. The primary difference between the second instantaneous tripping circuit 500 and the first instantaneous tripping circuit 400 is that the second instantaneous tripping circuit 500 is only operative during certain operating conditions of the circuit breaker CB and otherwise its operation is inhibited or prevented as will be explained in detail hereinafter, whereas the first instantaneous tripping circuit 400 is operative during substantially all operating conditions of the circuit breaker CB except, of course, when the circuit breaker CB is in an open circuit operating condition. The second instantaneous tripping circuit 500 is connected between the auctioneering circuit 110 and the output circuit 600 to respond to the highest instantaneous line current in the conductors L1, L2 and L3 when the highest instantaneous line current exceeds substantially a predetermined or threshold value which is substantially equal to the maximum current against which the operating means or mechanism of the circuit breaker CB is capable of closing and latching in the line contacts BC1, BC2 and BC3 to actuate the output circuit 600 to energize the trip coil 36 substantially instantaneously when permitted to do so by the associated timing or disabling circuit 520 during certain operating conditions of the circuit breaker CB.

More specifically, the instantaneous tripping circuit 500 comprises the level detecting circuit 510 which includes a voltage dividing network which controls the conducting state of a control means which comprises the diode D38 and a timing or disabling circuit 520 which renders the level detecting circuit 510 inoperative during certain operating conditions of the circuit breaker CB. The voltage dividing network of the instantaneous tripping circuit 500 includes the resistors R36, R37 and R38 which are connected in series with one another between the variable voltage output conductor V2 of the current auctioneering circuit 110 and the common conductor N1. The anode of the normally reverse biased or blocked diode D38 is connected to the junction point between the resistors R37 and R38, while the cathode of said diode is connected to the base of the transistor Q20 of the output circuit 600 through the conductor TL1 and the diode D45. The capacitor C16 is connected electrically in parallel with the resistor R38 between the anode of the diode D38 and the common conductor N1 in order to provide a predetermined degree of noise suppression in the operation of the instantaneous tripping circuit 500 by diverting the output of the instantaneous tripping circuit 500 to the common conductor N1 when the output is due to transient voltage surges which may occur during the operation of the overall protective device shown in FIG. 1. The capacitor C16 also provides a pulse of discharge current to the output circuit 600 during the operation of the instantaneous tripping circuit 500 to insure that the transistors Q20 and Q23 are both actuated to substantially saturated conditions and to insure that the controlled rectifier Q26 is actuated to a substantially conducting condition to energize the trip coil 36 during the overall operation of the protective device shown in FIG. 1. The diode D37 is connected between the junction point of the resistors R36 and R37 and the positive conductor P1 to assist in the operation of the timing or disabling circuit 520 during certain operating conditions, as will be explained hereinafter.

In considering the operation of the level detecting circuit 510 of the instantaneous tripping circuit 500, it will be assumed that the level detecting circuit 510 is not rendered inoperative or disabled by the operation of the timing or disabling circuit 520 which will be described hereinafter. During such an operating condition, the diode D38 is normally reverse biased due to the positive potential which is applied to the cathode of the diode D38 at the conductor TL1. The voltage at the anode of the diode D38 is substantially proportional to the unidirectional voltage across the resistor R1 and, in turn, to the highest instantaneous line current flowing in the conductors L1, L2 and L3 as reflected by the unidirectional voltage at the conductor V2 which is unfiltered and which is applied to the series circuit which includes the resistors R36, R37 and R38. More specifically, the voltage at the anode of the diode D38 is equal to the voltage at the upper end of the resistor R38 which is also equal to the voltage across the resistor R38 with respect to the common conductor N1. As long as the highest instantaneous line current flowing in the conductors L1, L2 and L3 remains below substantially a predetermined value which is substantially equal to the maximum current against which the operating means or mechanism of the circuit breaker CB is capable of closing and latching in the line contacts BC1, BC2 and BC3, the anode-cathode circuit of the diode D38 is reverse biased and the diode D38 is maintained in a substantially non-conducting condition.

During the assumed operating condition, when the highest instantaneous line current flowing in one of the conductors L1, L2 and L3 exceeds the predetermined value just mentioned to which the level detecting circuit 510 responds due to the relative values of the resistances of the resistors R36, R37 and R38 and the corresponding unidirectional voltage across the resistor R1 exceeds substantially a predetermined value, the voltage at the anode of the diode D38 increases in a positive direction sufficiently to forward bias the diode D38 and to actuate the diode D38 to a substantially conducting condition. When the diode D38 is actuated to a conducting condition, a base drive current flows from the conductor V2 through the resistors R36, R37, the diode D38, the conductor TL1 and the diode D45 into the base-emitter circuit of the transistor Q20 of the output circuit 600 to actuate the transistor Q20 to a substantially saturated condition and to thereby actuate the output circuit 600 to energize the trip coil 36 of the circuit breaker CB. When the highest instantaneous line current flowing in the conductors L1, L2 and L3 exceeds the substantially predetermined or fixed value to which the level detecting circuit 510 of the instantaneous tripping circuit 500 responds as just described, the instantaneous tripping circuit 500 actuates the energization of the tripping coil 36 in a substantially instantaneous manner without any intentional time delay.

The timing circuit or disabling circuit 520 is connected, in general, between the power supply input circuit 100 and the level detecting circuit 510 of the instantaneous tripping circuit 500 to be responsive to the current in the line conductors L1, L2 and L3 which also flows in the contacts BC1, BC2 and BC3 of the circuit breaker CB for rendering the level detecting circuit 510 inoperative to actuate the output circuit 600 to produce the output which energizes the trip coil 36 when the contacts BC1, BC2 and BC3 are closed and latched in by the operating mechanism of the circuit breaker CB after substantially a predetermined or fixed time delay.

More specifically, the timing or disabling circuit 520 comprises the NPN transistor Q17 and the resistor-capacitor timing circuit which includes the resistor R34 and the capacitor C15 which are connected in series with one another between the positive conductor P1 and the common conductor N1. It is important to note that the existence of the potentials at the positive conductors P1, P2 and P3 depends upon the current flow in the line conductors L1, L2 and L3 which also flows through the line contacts BC1, BC2 and BC3 of the circuit breaker CB when said contacts are closed. The upper side of the timing capacitor C15 is also connected to the base of the transistor Q17 with the resistor R35 being connected electrically in parallel with the capacitor C15 between the base of the transistor Q17 and the common conductor N1 to provide a discharge path for the charge on the capacitor C15 during certain operating conditions of the disabling circuit 520. The emitter of the transistor Q17 is connected directly to the common conductor N1 while the collector of the transistor Q17 is connected to the junction point between the resistors R37 and R38 of the level detecting circuit 510 which is also connected to the anode of the diode D38, as previously described.

In the operation of the disabling circuit 520, it will be assumed initially that the line contacts BC1, BC2 and BC3 of the circuit breaker CB which are shown in the closed position in FIG. 1 are open and that no line current is flowing in the conductors L1, L2 and L3 of the protected electrical system or circuit. When the operating means of the circuit breaker CB actuates the line contacts BC1, BC2 and BC3 to the closed positions shown in FIG. 1, and currents flow in the line conductors L1, L2 and L3, a potential will appear at the positive conductor P1 which depends upon the levels or magnitudes of the line currents in said conductors which may be expressed relative to or as a percentage of the continuous current rating of the circuit breaker CB. Prior to the appearance of a potential at the positive conductor P1, the timing capacitor C15 is substantially completely discharged due to the presence of the discharge resistor R35 as previously indicated. The transistor Q17 is therefore in a substantially nonconducting condition immediately after the closing of the line contacts BC1, BC2 and BC3 due to the absence of a sufficient voltage between the base and the emitter of said transistor to apply the necessary base drive current to the base-emitter circuit of the transistor Q17 which is necessary to actuate said transistor to a substantially saturated condition. Since the transistor Q17 is initially substantially nonconducting, the disabling circuit 520 will have substantially no effect on the operation of the level detecting circuit 510 which was previously described.

After the contacts BC1, BC2 and BC3 of the circuit breaker CB are actuated to the closed positions shown in FIG. 1, a potential will appear at the positive conductor P1 which depends upon the levels or magnitudes of the line currents in the conductors L1, L2 and L3 which may be expressed as a percentage or fraction of the continuous current rating of the circuit breaker CB. The capacitor C15 will then start to charge from the voltage between the conductors P1 and N1. As the line currents flow in the conductor L1, L2 and L3 and assuming that the potential at the positive conductor P1 is equal to or greater than substantially a predetermined minimum value, the voltage across the capacitor C15 will gradually increase after a predetermined time delay until the voltage at the base of the transistor Q17 is sufficient to forward bias the base-emitter circuit of the transistor Q17 to thereby actuate the transistor Q17 to a substantially saturated operating condition. It is important to note that the emitter of the transistor Q17 is directly connected at the common conductor N1. Since the emitter of the transistor Q17 is connected to the common conductor N1, the necessary voltage at the base of the transistor Q17 which is necessary to apply a base drive current to the base-emitter circuit of the transistor Q17 which is sufficient to actuate the transistor Q17 to substantially a saturated operating condition is approximately 0.6 volt which is positive at the base of the transistor Q17 with respect to voltage at the emitter of said transistor or at the common conductor N1. Assuming that the values of the resistances of the resistors R34 and R35 are substantially equal, the predetermined minimum value of the potential at the conductor P1 which is necessary to permit the capacitor C15 to gradually charge up after a predetermined time delay to a voltage which is sufficient to forward bias the base-emitter circuit of the transistor Q17 and to actuate the transistor Q17 to a substantially saturated operating condition is approximately 1 to 2 volts which is positive with respect to voltage at the common conductor N1. In other words, the voltage at the conductor P1 need only be a fraction of the normal regulated potential which is maintained at the conductor P1 during the normal operation of the protective device shown in FIG. 1. It has been found that the corresponding levels of line currents in the conductors L1, L2 and L3 in order to result in the minimum predetermined potential at the conductor P1 as just described is approximately 5 percent or as low as 2 percent of the continuous current rating of the circuit breaker CB and in any event is less than 10 percent of or 1/10 of the continuous current rating of the circuit breaker CB.

When the transistor Q17 is actuated to a substantially saturated operating condition, any base drive current which might otherwise flow from the variable voltage conductor V2 through the resistors R36 and R37 and the diodes D38 and D45 into the base-emitter circuit of the transistor Q20 of the output circuit 600 will be diverted away from the diode D38 into the collector-emitter circuit of the transistor Q17 and flow to the common conductor N1 to thereby disable or render the level detecting circuit 510 of the instantaneous tripping circuit 500 inoperative. In other words, after the contacts BC1, BC2 and BC3 of the circuit breaker CB are closed and latched in, and a potential of a predetermined level appears at the positive conductor P1 as just described, the disabling circuit 520 will render the level detecting circuit 510 of the instantaneous tripping circuit 500 inoperative after substantially a predetermined time delay which depends upon the values of the resistor R34 and the capacitor C15 and the potential at the conductor P1 with respect to the potential at the common conductor N1. After the level detecting circuit 510 is disabled or rendered inoperative by the disabling circuit 520 as just described, the instantaneous tripping circuit 500 will be unable to actuate the output circuit 600 to energize the trip coil 36 in response to the highest line current in the conductors L1, L2 and L3 exceeding the predetermined value to which the level detecting circuit would otherwise respond. It is to be noted that the predetermined time delay which is provided by the operation of the disabling circuit 520 is sufficient to allow a reasonable time for the operating means or mechanism of the circuit breaker CB to close the contacts BC1, BC2 and BC3 and to latch said contacts in before the level detecting circuit 510 of the instantaneous tripping circuit 500 is disabled. In a typical application, the predetermined time delay provided by the disabling circuit 520 may be from 3 to 8 cycles of the alternating current which flows from the conductors L1, L2 and L3 and which also flows in the contacts BC1, BC2 and BC3.

After the transistor Q17 is actuated to a substantially saturated operating condition, as just described, but before the full regulated potentials result at the conductors P1, P2 and P3 of the protective device shown in FIG. 1, the ability or capacity of the transistor Q17 to divert current away from the resistor R38 and prevent the voltage at the junction of the resistors R37 and R38 from increasing to a value which would forward bias the diode D38 is limited in the event that very high line currents should flow in the conductors L1, L2 and L3 before such full regulated potentials are present at the conductors P1, P2 and P3. In other words, during such an operating condition of the circuit breaker CB, if no means were provided to prevent the forward biasing of the diode D38, even after the transistor Q17 has been actuated to a substantially saturated operating condition but before full regulated potentials are present at the conductors P1, P2 and P3, very high line currents in the conductors L1, L2 and L3, such as in excess of a predetermined value which may, for example, be twelve times the continuous current rating of the circuit breaker CB might override the clamping action of the transistor Q17 and forward bias the diode D38 to thereby actuate a tripping operation of the circuit breaker CB. The purpose of the resistor R37 and the diode D37 is to prevent such an improper operation of the protective device shown in FIG. 1.

More specifically, if after the transistor Q17 has been actuated to a substantially saturated operating condition and very high line currents should result in the conductors L1, L2 and L3 before the full regulated potentials result or appear at the conductors P1, P2 and P3, a portion of the current flowing through the resistor R36 from the variable voltage conductor V2 will be diverted away from the resistor R38 through the diode D37 to the positive conductor P1. The current which is thus diverted away from the resistor R38 will prevent the voltage at the anode of the diode D38 from rising to a value which would forward bias the diode D38 and actuate an improper operation of the output circuit 600 which might otherwise result. When the normal regulated potentials appear at the conductors P1, P2 and P3, the base drive current applied to the transistor Q17 will increase to effectively increase the clamping or current diverting ability of the collector-emitter circuit of the transistor Q17. It is to be noted that as long as the line currents in the conductors L1, L2 and L3 remain below a predetermined level at which the circuit which includes the diode D37 becomes effective as just indicated, the voltage at the upper end of the resistor R38 is permitted to rise or increase when proper or appropriate prior to the transistor Q17 being actuated to a substantially saturated operating condition.

In the overall operation of the instantaneous tripping circuit 500, after the line contacts BC1, BC2 and BC3 are actuated to the closed positions shown in FIG. 1 by the operating mechanism of the circuit breaker CB, if the highest instantaneous line current flowing in the conductors L1, L2 and L3 exceeds the predetermined value which is substantially equal to the maximum current against which the operating mechanism of the circuit breaker CB is capable of closing and latching in said contacts, the level detecting circuit 510 of the instantaneous tripping circuit 500 will actuate the output circuit 600 of the protective device shown in FIG. 1 to energize the trip coil 36 and prevent the circuit breaker CB from attempting to close against a current which is in excess of the predetermined value just mentioned. If however the operating mechanism of the circuit breaker CB closes the line contacts BC1, BC2 and BC3 and latches said line contacts in within the predetermined time delay provided by the disabling circuit 520, the disabling circuit 520 will operate as previously described and disable the level detecting circuit 510 of the instantaneous tripping circuit 500 which will then have no further effect on the overall operation of the protective device shown in FIG. 1. It is to be noted that once the line contacts BC1, BC2 and BC3 of the circuit breaker CB are closed and latched in, the operating mechanism of the circuit breaker CB may be capable of holding said line contacts in the closed positions for at least a relatively short time period at a relatively higher instantaneous current and the short delay tripping circuit 300 may therefore be adjusted to respond to a relatively higher current than the level detecting circuit 510 of the instantaneous tripping circuit 500 to permit the application of the circuit breaker CB in a power system having a relatively higher fault current capacity than the current against which the circuit breaker CB is capable of closing and latching in the line contacts BC1, BC2 and BC3. Since the protective device shown in FIG. 1 is capable of discriminating between the open and closed positions of the circuit breaker CB, the operating characteristics of the protective device may be adjusted or modified between the open and closed positions of the circuit breaker CB by the instantaneous tripping circuit 500 to coordinate with the closing capabilities of the circuit breaker CB.

GROUND CURRENT TRIPPING CIRCUIT 700

Referring now to the ground current tripping circuit 700 which is indicated in block form in FIG. 1 and which is shown in detail in FIGS. 2A and 2B, the ground current tripping circuit 700, in general, is connected between inputs which are obtained from the ground current transformer T4 and the auctioneering circuit 110 and the output circuit 600 to actuate the output circuit 600 to energize the trip coil 36 of the circuit breaker CB when the magnitude of the ground current, as sensed by the transformer T4 exceeds substantially a predetermined or threshold value during a first operating condition when the highest instantaneous line current in the conductors L1, L2 and L3 is below substantially a predetermined or threshold value with substantially a predetermined or fixed time delay being provided between the time that the ground current exceeds the predetermined value and the time that the trip coil 36 of the circuit breaker CB is energized. During a second type of operating condition when the highest instantaneous line current flowing in the conductors L1, L2 and L3, as sensed by the auctioneering circuit 110, exceeds a predetermined or threshold value, the ground current tripping circuit 700 actuates the output circuit 600 to energize the trip coil 36 of the circuit breaker CB when the magnitude of the ground current in the protected system or circuit exceeds a value which varies with or depends upon the highest instantaneous line current in said conductors with substantially a predetermined or fixed time delay being provided between the time that the ground current exceeds the particular or appropriate value and the time that the trip coil 36 and the circuit breaker CB is energized.

As best shown in FIG. 1, the alternating output ground current of the ground current transformer T4 which is available at the terminals 142 and 144 at the opposite ends of the secondary winding of the transformer T4 is applied at the input terminal of the full wave bridge type rectifier circuit 80 which includes a plurality of diodes, as best shown in FIG. 2A, to obtain a unidirectional output current which is substantially proportional to the actual ground current in the electrical system being protected which includes the line conductors L1, L2 and L3 and the neutral conductor N. The positive output terminal of the full wave rectifier circuit 80 is connected to the positive conductor P1 through the conductor G10, the terminal 314, and the resistor R54, as best shown in FIG. 2B, to develop a unidirectional voltage or signal across the resistor R54 which is substantially proportional to the ground current in the electrical system being protected. The negative output terminal of the full wave rectifier circuit 80 is connected to the common conductor N1 through the conductor G12. It is important to note that the resistor R54 is electrically connected in series with the energy storing capacitor C1 of the power supply input circuit 100 since the lower end of the resistor R54 is connected to the conductor P1 and to the right side of the energy storing capacitor C1 which is also connected to the conductor P1 as shown in FIG. 2A. The series circuit which includes the resistor R54 and the capacitor C1 is connected across the unidirectional output terminals of the full wave rectifier circuit 80 since the other side of the capacitor C1 is connected to the common conductor N1 as shown in FIG. 2A. In other words, the ground current transformer T4 is connected as a substantially constant current source to provide an alternating output current which is rectified by the full wave rectifier circuit 80 and then applied to the resistor R54 to develop a unidirectional current voltage or signal to which the ground current tripping circuit 700 responds and it charges the energy storing capacitor C1 which is connected in series with the resistor R54. It is also important to note that the maximum unidirectional voltage to which the energy storing capacitor C1 can be charged from the transformer T4 through the full wave rectifier circuit 80 is limited by the operation of the shunt voltage regulator circuit 140 which is electrically connected in parallel with the capacitor C1 between the conductor T1 and the common conductor N1, as previously described.

More specifically, the ground current tripping circuit 700 includes a level detecting circuit 710 which responds to the ground current input signal across the resistor R54 to provide an output when the ground current in the protected alternating current system exceeds a predetermined value as long as the highest instantaneous line current in the conductors L1, L2 and L3 remains below a predetermined value as sensed by the auctioneering circuit 110, the circuit means 730 which actuates the level detecting circuit 710 or modifies the operation of the level detecting circuit 710 to respond to a value of ground current in the protected system which varies with the highest instantaneous line current in said conductor when the highest instantaneous line current exceeds the predetermined or threshold value just mentioned to produce said output and a time delay circuit 720 which provides a substantially predetermined or fixed time delay between the time that the level detecting circuit 710 produces said output in response to the value of the ground current in the protected system and the time that the trip coil 36 is energized by the operation of the output circuit 600 when actuated by the ground current tripping circuit 700 to trip the circuit breaker CB.

The level detecting circuit 710 of the ground current tripping circuit 700 as shown in FIG. 2B includes a time delay reset arrangement similar to that of the level detecting circuit 240 of the long time delay tripping circuit 200 and to that of the level detecting circuit 310 of the short delay tripping circuit 300 as previously described. In particular, the input of the level detecting circuit 710 comprises the voltage dividing network which includes the resistors R43 and R44 which are connected in series with one another between the positive output terminal of the rectifier circuit 80 through the conductor G10 at the upper end of the resistor R54 and the positive conductor P3. The level detecting circuit 710 also includes the PNP transistors Q21 and Q22. The base of the transistor Q21 is connected to the junction point between the resistors R43 and R44, while the emitter of the transistor Q21 is connected to the positive conductor P1. In order to protect the emitter-base circuit of the transistor Q21 from excessive reverse bias by limiting the reverse emitter-base voltage, the diode D40 is connected between the base and the emitter of the transistor Q21 to limit the voltage between the emitter and the base of the transistor Q21 to the forward voltage drop of the diode D40. The connector of the transistor Q21 is connected to the common conductor N1 through the collector load resistor R49 and also to the base of the transistor Q22. The emitter of the transistor Q22 is also connected to the positive conductor P1, while the collector of the transistor Q22 is connected to the common conductor N1 through the collector load resistor R50. The collector of the transistor Q22 is also connected to the upper side of the timing capacitor C21 through the normally forward biased diode D42. In order to delay the reset of the level detecting circuit 710 of the ground current tripping circuit 700 after the ground current in the protected system exceeds the value which is sufficient to actuate the level detecting circuit 710 to produce an output, as will be explained in detail hereinafter, and then decreases below such a value before the time delay provided in the operation of the ground current tripping circuit 700 or the operation of the time delay circuit 720 is completed, the capacitor C20 is connected between the emitter and the collector of the transistor Q22.

As previously mentioned, the circuit means or second level detecting circuit 730 of the ground current tripping circuit 700 is connected in general between the current auctioneering circuit 110 of the power supply input circuit 100 and the level detecting circuit 710 of the ground current tripping circuit 700 for modifying the operation of the level detecting circuit 710 or for actuating the level detecting circuit 710 to respond to a value or level of ground current in the protected system which varies with the highest line current flowing in the conductors L1, L2 and L3 as reflected in the output of the auctioneering circuit 110 when the highest line current flowing in said conductors exceeds a predetermined or threshold value. More specifically, the input of the circuit means 730 includes the resistor R39 and the emitter-base circuit of the PNP transistor Q18 which are connected in series with one another between the upper end of the resistor R1 of the auctioneering circuit 110 and the positive conductor P1 with the upper end of the resistor R39 being connected to the variable voltage output conductor V3 and the base of the transistor Q18 being directly connected to the conductor P1. The collector of the transistor Q18 is connected to the common conductor N1 through the collector load resistors R40 and R41 which are connected in series with one another between the collector of said transistor and the common conductor N1. The circuit means 730 also includes the NPN transistor Q19 whose base is connected to the junction point of the resistors R40 and R41 and whose emitter is connected to the common conductor N1 through the resistor R42, the conductor 713 and the base-emitter circuit of the transistor Q1 which forms part of the shunt voltage regulator circuit 140 as best shown in FIG. 2A. The collector of the transistor Q19 is connected to the junction point between the resistors R43 and R44 of the level detecting circuit 710.

The time delay circuit 720 of the ground current tripping circuit 700 comprises the rheostat RP6 and the resistor R51 which are connected in series with one another between the positive conductor P1 through the electrical conductor 615 and the terminal 612 and the upper side of the timing capacitor C21 which is connected in series with the rheostat RP6 and the resistor R51 between the positive conductor P1 and the common conductor N1. The upper side of the timing capacitor T21 is also connected to the base of the transistor Q20 of the output circuit 600 through the normally reverse biased or blocked isolating diode D41, the conductor TL1 and the diode D45 and to the junction point between the collector of the transistor Q22 and the collector load resistor R50 through the normally forward biased diode D42.

In the operation of the ground current tripping circuit 700, it will be assumed initially that the ground current in the electrical system being protected is below substantially a minimum predetermined value as sensed by the ground current transformer T4 and that the highest line current flowing in the conductors L1, L2 and L3 is below a predetermined value as sensed by the current auctioneering circuit 110 and as established by the operation of the circuit means 730, as will be explained in detail hereinafter. During such as assumed operating condition, the emitter-base circuit of the transistor Q21 will be forward biased since the voltage at the emitter of the transistor Q21 which is the same as the regulated potential at the positive conductor P1 will be greater than the voltage at the base of the transistor Q21 which is equal to the voltage at the positive conductor P3 plus the voltage drop across the resistor R44. As long as the transistor Q21 is in a substantially saturated operating condition, due to the forward biasing of its emitter-base circuit, the emitter-collector current of the transistor Q21 will produce a voltage drop across the resistor R49 which results in a substantially zero voltage bias of the base-emitter circuit of the transistor Q22 and the transistor Q22 will be maintained in a normally substantially nonconducting condition. As long as the transistor Q21 is substantially nonconducting, the voltage drop across the resistor R50 will be substantially negligible or at a relatively low value and the diode D42 will be forward biased due to the voltage at the positive conductor P1 which is applied to the anode of the diode D42 through the rheostat RP6 and the resistor R51. As long as the diode D42, which comprises a control means whose conduction is controlled by the operation of the ground current tripping circuit 700, is forward biased and in a substantially conducting condition, the timing capacitor C21 will be prevented from accumulating a charge on the positive conductor P1 through the resistor R51 since the current flow from the conductor P1 through the rheostat RP6 and the resistor R51 will be diverted away from the capacitor C21 to the common conductor N1 through the diode D42 and the resistor R80. It is to be noted that as long as the transistor Q22 remains in a substantially nonconducting condition, the capacitor C20 will charge up to a voltage which is equal to the voltage difference between the conductors P1 and N1 less the relatively low voltage drop across the resistor R50. It is also to be noted that as long as the diode D42 remains forward biased, the voltage at the upper side of the capacitor C21 will be equal to the sum of the forward voltage drop of the diode D42 and the voltage drop across the resistor R50 which is relatively low so that the diode D41 will be reverse biased or blocked due to the potential which is applied at the cathode of the diode D41.

In the operation of the ground current tripping circuit 700, assuming that the highest line current remains below the predetermined value to which the circuit means 730 responds to modify the response of the level detecting circuit 710, when the ground current in the electrical system being protected exceeds substantially a minimum predetermined or threshold value to which the level detecting circuit 710 is set to respond and the corresponding unidirectional voltage across the resistor R54 exceeds substantially a corresponding predetermined value, the voltage at the base of the transistor Q21 will increase sufficiently in a positive direction to reverse bias the emitter-base circuit of the the transistor Q21 which will then be actuated from a substantially saturated operating condition to a substantially nonconducting condition. When the transistor Q21 is actuated to a substantially nonconducting condition, the current in the emitter-collector circuit of the transistor Q21 will decrease to a negligible value and the current which flows in the resistor R49 will be diverted away from the transistor Q21 and will flow from the positive conductor P1 through the emitter-base circuit of the transistor Q22. The transistor Q22 will then be actuated from a substantially nonconducting condition to a substantially saturated operating condition. When the transistor Q22 is actuated to a substantially saturated operating condition, the emitter-collector of the transistor Q22 will increase to thereby increase the voltage drop across the resistor R50 and to reverse bias or block the diode D42 which will then permit the timing capacitor C21 to start accumulating a charge from the positive conductor P1 through the rheostat RP6 and the resistor R51. If permitted to do so by the continuing of the ground current to exceed the minimum predetermined value, the voltage across the timing capacitor C21 will increase after a predetermined time delay to a value which is sufficient to forward bias the diode D41. It is to be noted that since the timing capacitor C21 is charged from the regulated potential at the conductor P1 through the rheostat RP6 and the resistor R51, the time delay provided by the time delay circuit 720 will be substantially a predetermined or fixed value after the charging of the capacitor C21 is started by the operation of the level detecting circuit 710 and will be independent of the degree to which the ground current exceeds the minimum predetermined or threshold value to which the ground current tripping circuit 700 responds during the assumed operating condition. When the diode D41 is forward biased by the voltage across the timing capacitor C21, the current will flow from the positive conductor P1 through the rheostat RP6, the resistor R51 and the diode D41 to the base of the transistor Q20 of the output circuit 600 through the diode D45 which will then be actuated to energize the trip coil 36 of the circuit breaker CB from the energy storing capacitor C1 and to actuate said circuit breaker to an open circuit condition as previously described in detail in connection with the long time delay tripping circuit 200. It is to be noted that during the assumed operating conditions just described, the level detecting circuit 710 produces a first output which may be considered to be the increased voltage drop across the resistor R50 which permits the timing capacitor C21 to start accumulating a charge and then the time delay circuit 720 produces a second output of the ground current tripping circuit 700 which is the output current which flows through the diode D41 after a predetermined or fixed time delay which is initiated when the level detecting circuit 710 produces the first output just mentioned.

During the assumed operating condition, if the ground current in the protected system exceeds a predetermined value necessary to actuate the transistor Q22 to a substantially saturated operating condition as just described, the capacitor C20 which is connected between the emitter and the collector of the transistor Q22 will be rapidly discharged through the emitter-collector path of the transistor Q22. If the ground current during the assumed operating condition exceeds a predetermined value necessary to actuate the transistor Q22 to substantially a saturated condition and then instantaneously decreases below the predetermined value, the capacitor C20 will gradually charge to the resistor R50 until the voltage at the cathode of the diode D42 decreases due to the decreasing voltage drop across the resistor R50 sufficiently to forward bias the diode D42 to thereby rapidly discharge or reset the capacitor C21 if the voltage across the capacitor C21 has not yet increased to the value necessary to forward bias the diode D41. The time delay in the resetting of the ground current tripping circuit 700 following the end of the ground current which exceeds the value towards the level detecting circuit 710 responds during a particular operating condition to thereby actuate the operation of the level detecting circuit 710 is for a time period which may for example be slightly longer than one half cycle of the alternating current which flows in the conductors L1, L2 and L3 and is determined by the values of the capacitor C20 and the resistor R50 and the voltage between the conductors P1 and N1. In other words, if the value of ground current in the circuit being protected exceeds the value to which the level detecting circuit 710 responds during a particular operating condition and then continues without an interruption longer than the resetting time delay of the level detecting circuit 710, the charging of the capacitor C21 will continue in an uninterrupted manner until the fixed time delay provided by the time delay circuit 720 of the ground current tripping circuit 700 is completed. It is to be noted that the predetermined time delay provided by the time delay circuit 720 of the ground current tripping circuit 700 may be varied between minimum and maximum values by the adjustment or setting of the rheostat RP6 which forms part of the time delay circuit 720.

During the assumed operating condition, it was assumed that the highest line current flowing in the conductors L1, L2 and L3 was below a predetermined value to which the circuit means 730 responds as reflected in the output of the auctioneering circuit 110. During the assumed operating condition, the voltage at the emitter of the transistor Q18 of the circuit means 730 with respect to the voltage at the base of the transistor Q18 is insufficient to apply a base drive current to the base-emitter circuit of the transistor Q18 and both of the transistors Q18 and Q19 will be maintained in substantially nonconducting conditions. As long as the transistors Q18 and Q19 remain in substantially nonconducting coditions, the current flow from the conductor G10 through the resistor R43 at the input of the level detecting circuit 710 and into the collector-emitter circuit of the transistor Q19 will be substantially negligible and the circuit means 730 will have substantially no effect on the operation of the level detecting circuit 710 of the ground current tripping circuit 700. In other words, during the assumed operating conditions, substantially none of the output current from the ground current transformer T4 which is applied to the input of the level detecting circuit 710 through the rectifier circuit 80 will be diverted away from the resistor R44 of the level detecting circuit 710 by the circuit means 730 and the operation of the level detecting circuit 710 will be as just described to respond to a substantially predetermined value of the ground current in the protected system as sensed by the transformer T4.

When the highest line current flowing in the conductors L1, L2 and L3 exceed substantially a predetermined value to which the circuit means 730 responds, the voltage at the conductor V3 which is connected to the output of the auctioneering circuit 110 will increase to a value which is sufficiently greater than the voltage at the conductor P1 which is connected to the base of the transistor Q18 to apply a base drive current to the emitter-base circuit of the transistor Q18 which will be amplified in the corresponding collector-emitter circuits of the transistors Q18 and Q19. The increased currents which flow in the collector-emitter cricuits of the transistors Q18 and Q19 will flow from the conductor G10 through the resistor R43 and thus divert a portion of the current which would otherwise flow to the resistor R44 of the level detecting circuit 710 away from the resistor R44 to effectively decrease the ground current signal to which the level detecting circuit 710 responds. As the highest line current flowing in the conductors L1, L2 and L3 increases the amount of current which is diverted away from the resistor R44 also increases. In other words, when the highest line current flowing in the conductors L1, L2 and L3 exceeds the predetermined value to which the circuit means 730 respond and increases above the predetermined value, the value of ground current which flows in the protected system which is necessary to actuate the transistor Q21 from a substantially saturated condition to a substantially nonconducting condition increases with or varies with the highest line current in said conductors. In effect, the value of ground current which is necessary to actuate the level detecting circuit 710 after the highest line current exceeds the predetermined value to which the circuit means 730 responds must be greater than the minimum predetermined value which is necessary to actuate the level detecting circuit 710 as long as the highest line current in the conductors L1, L2 and L3 remains below the predetermined value necessary to actuate the circuit means 730 as just described. In other words, the value of ground current which was necessary to actuate the level detecting circuit 710 to produce the output across the resistor R50 previously mentioned after the highest line current in the conductors L1, L2 and L3 exceeds the predetermined value to which the circuit means 730 responds must be sufficient to increase the current through the resistor R43 sufficiently to offset the current which was diverted away from the resistor R44 by the operation of the circuit means 730.

Assuming that the value of the ground current is sufficient after the highest line current in the conductors L1, L2 and L3 has exceeded the predetermined value to which the circuit means 730 responds to actuate the level detecting circuit 710, the operation of the level detecting circuit 710 and the time delay circuit 720 is the same as previously described for the operating conditions when the highest line current was below the predetermined value to which the circuit means 730 responds and the ground current exceeds the minimum predetermined or threshold value which actuates the transistor Q21 of the level detecting circuit 710 from a substantially saturated condition to a substantially nonconducting condition and the transistor Q22 is actuated from a substantially nonconducting condition to a substantially saturated condition to thereby reverse bias the diode D42 and permit the start of the time delay provided by the time delay circuit 720.

It is to be understood that a protective device as disclosed may include first and second instantaneous tripping circuits, such as the instantaneous tripping circuit 500 previously described and an adjustable instantaneous tripping circuit such as the instantaneous tripping circuit 400 previously described, except that the first and second instantaneous tripping circuits would respond to different predetermined values of instantaneous currents and only one of the instantaneous tripping circuits, such as the instantaneous tripping circuit 500, would include a disabling circuit such as the disabling circuit 520 to thereby render only one of the instantaneous tripping circuits such as the instantaneous tripping circuit 500 inoperative upon the closing and latching in of the line contacts BC1, BC2 and BC3 of the associated circuit breaker CB. For example, where two instantaneous tripping circuits are provided, as indicated, one of the instantaneous tripping circuits may be adjusted to respond to a predetermined instantaneous current which is coordinated with the closing capabilities of the associated circuit breaker and rendered inoperative after the main contacts of the associated circuit breaker are closed and latched in, while the other instantaneous tripping circuit may be adjusted to respond to a relatively higher instantaneous current after the main contacts of the circuit breaker are closed and latched in without being rendered inoperative by a disabling circuit such as would be used with the first instantaneous tripping circuit. This is to take advantage of the current interrupting capability of a particular circuit breaker which may be relatively greater than the maximum current against which the operating mechanism of the circuit breaker is capable of closing and latching in the associated line contacts.

The circuits and apparatus embodied in the teachings of this invention have several advantages. For example, the circuit breaker including the protective device as disclosed is capable of discriminating between open and closed operating conditions of the circuit breaker to modify the operating characteristics of the protective device to thereby coordinate the operating characteristics of the protective device with respect to the open and closed conditions of the contacts of the associated circuit breaker. As previously mentioned, a particular circuit breaker may be designed to be capable of interrupting a relatively larger current than the maximum current against which the closing or operating mechanism of the circuit breaker is capable of closing and latching in the line contacts of the circuit breaker. Since the construction of a circuit breaker including a protective device, as disclosed, may be closely coordinated with the operating requirements in a particular application with respect to the closing and interrupting requirements of the circuit breaker, the closing forces involved in the operation of the circuit breaker may be reduced to thereby reduce the requirements of the operating mechanism as far as the closing function. Another advantage of the disclosed protective device is that the disabling circuit 520 which forms part of the second instantaneous tripping circuit 500 responds to relatively much lower levels of line current in the contacts of the associated circuit breaker to initiate the time delay which is required before the associated level detecting circuit 510 is rendered inoperative or disabled with the levels of the line currents being a relatively small fraction, such as 10 percent or less, of the continuous current rating of the associated circuit breaker CB. In addition, a protective device as disclosed includes a further advantage in that any improper operation of the protective device is prevented during the particular operating condition after the disabling circuit 520 has actuated the transistor Q17 to a substantially saturated condition but before the full regulated potentials result at the conductors P1, P2 and P3 in the event that relatively high line currents should result in the contacts of the associated circuit breaker as disclosed in detail. Other advantages of a circuit breaker including a protective device as disclosed is that a circuit breaker may be employed to protect an electrical system having a relatively greater fault current capacity than the maximum current against which the circuit breaker is capable of closing as required in a particular application and no electrical connections or wiring are required between any auxiliary contacts on the associated circuit breaker and the circuits which form part of the protective device shown in FIG. 1.

We claim:

1. A circuit breaker comprising separable contacts adapted to carry a predetermined continuous current operating means for opening and for closing and latching in the contacts and an overcurrent protective device operatively connected to said operating means and responsive to the current in said contacts for producing an output to actuate said operating means to open said contacts, said protective device means including first means responsive to the current in said contacts for providing a unidirectional output potential, second means responsive to the current in said contacts for actuating said protective device to produce said output when said current exceeds a first predetermined value after substantially a predetermined time delay, third means responsive to the current in said contacts for independently actuating said protective device to produce said output substantially instantaneously when the current in said contacts exceeds a second predetermined value which is substantially equal to the maximum current against which said operating means is capable of closing and latching in said contacts, and fourth means responsive to the current in said contacts and connected in said first means for rendering said third means inoperative to actuate said protective device to produce said output when said contacts are closed by said operating means after substantially a predetermined time delay which starts when the unidirectional output potential increases to a predetermined value which results when a relatively small portion of said predetermined continuous current is being carried by said contacts, said predetermined time delay being sufficient to allow a reasonable time for said operating means to close and latch in said contacts.

2. The combination as claimed in claim 1 wherein said relatively small portion of said predetermined continuous current which is carried by said contacts at which said predetermined value of said output unidirectional potential results to start said predetermined time delay associated with said fourth means is less than one-tenth of said predetermined continuous current.

3. The combination as claimed in claim 1 wherein said third means includes a level detecting circuit connected to be responsive to the current in said contacts and said fourth means includes a transistor and a timing circuit connected in circuit relation with said first means and said third means, said transistor being actuable between a substantially nonconducting condition and a substantially saturated operating condition to render said third means inoperative.

4. The combination as claimed in claim 3 wherein said relatively small portion of said predetermined continuous current which is carried by said contacts at which said predetermined value of said output unidirectional potential results to start said predetermined time delay associated with said fourth means is less than one-tenth of said predetermined continuous current.

5. The combination as claimed in claim 1, wherein an additional means is provided which is responsive to the current in said contacts for actuating said protective device to produce said output when the current in said contacts exceeds a predetermined value which is relatively greater then said second predetermined value.

6. The combination as claimed in claim 1 wherein said separable contacts includes three sets of separable contacts and said protective device includes an additional means responsive to the currents in said three sets of contacts for deriving an output current which is substantially proportional to only the highest of the currents in said three sets of contacts, said second means and said third means being connected to said additional means to be responsive to said latter output current.

References Cited

UNITED STATES PATENTS 3,602,783  8/1971  Engle et al. _____ 317—38 X
3,660,722  5/1972  Wilson et al. _____ 317—38 X JAMES D. TRAMMELL, Primary Examiner U.S. Cl. X.R.

307—38, 141 S, 293